(12) United States Patent
Jordan

(10) Patent No.: US 11,661,139 B2
(45) Date of Patent: May 30, 2023

(54) ELECTROMECHANICAL CONTROL DEVICE AND METHODS FOR ELECTROMECHANICAL CONTROL OF A BICYCLE

(71) Applicant: SRAM, LLC, Chicago, IL (US)

(72) Inventor: Brian Jordan, Highland Park, IL (US)

(73) Assignee: SRAM, LLC, Chicago, IL (US)

( * ) Notice: Subject to any disclaimer, the term of this patent is extended or adjusted under 35 U.S.C. 154(b) by 62 days.

(21) Appl. No.: 15/950,833

(22) Filed: Apr. 11, 2018

(65) Prior Publication Data
US 2019/0315435 A1 Oct. 17, 2019

(51) Int. Cl.
| | |
|---|---|
| *B62M 9/122* | (2010.01) |
| *B62M 25/08* | (2006.01) |
| *B62M 9/124* | (2010.01) |
| *B62M 9/132* | (2010.01) |
| *H04W 80/06* | (2009.01) |
| *H04W 74/00* | (2009.01) |
| *B62M 6/50* | (2010.01) |
| *B62J 45/10* | (2020.01) |

(52) U.S. Cl.
CPC .............. *B62M 9/122* (2013.01); *B62M 6/50* (2013.01); *B62M 9/124* (2013.01); *B62M 9/132* (2013.01); *B62M 25/08* (2013.01); *H04W 74/002* (2013.01); *H04W 80/06* (2013.01); *B62J 45/10* (2020.02); *B62M 2009/12413* (2013.01)

(58) Field of Classification Search
None
See application file for complete search history.

(56) References Cited

U.S. PATENT DOCUMENTS

| | | | |
|---|---|---|---|
| 6,734,376 | B2 | 5/2004 | Ichida et al. |
| 7,947,914 | B2 | 5/2011 | Takebayashi et al. |
| 8,378,240 | B2 | 2/2013 | Rajagopal et al. |
| 8,909,424 | B2 | 12/2014 | Jordan et al. |
| 9,056,651 | B2 * | 6/2015 | Tetsuka ................ B62M 9/132 |
| 2008/0164133 | A1 | 7/2008 | Hayafune |
| 2008/0175338 | A1 | 7/2008 | He et al. |
| 2008/0277251 | A1 | 11/2008 | Tatman et al. |
| 2011/0181402 | A1 | 7/2011 | Goodrich et al. |
| 2014/0090967 | A1 | 4/2014 | Inagaki |
| 2014/0102237 | A1* | 4/2014 | Jordan .................. B62M 9/122 |
| | | | 74/473.12 |
| 2015/0284049 | A1 | 10/2015 | Shipman et al. |
| 2016/0311491 | A1 | 10/2016 | Watarai |
| 2016/0339986 | A1* | 11/2016 | Jordan .................. H04B 1/082 |
| 2018/0057104 | A1 | 3/2018 | Komatsu et al. |

FOREIGN PATENT DOCUMENTS

| | | |
|---|---|---|
| CN | 1906719 | 1/2007 |
| TW | 200823105 | 6/2008 |
| TW | 201540600 | 11/2015 |
| TW | 201625464 | 7/2016 |
| TW | 201408533 | 4/2017 |

* cited by examiner

*Primary Examiner* — Yuen Wong
*Assistant Examiner* — Hongye Liang

(57) ABSTRACT

An electromechanical control system for a bicycle has a switch device, the switch device operating a switch between at least three positions. A control communication device transmits signals responsive to operation of the switch. The electromechanical control system includes an operation device configured to respond to signals transmitted by the control communication device. Signals transmitted by the control communication device include commands to listen and commands to operate.

14 Claims, 22 Drawing Sheets

US 11,661,139 B2

ELECTROMECHANICAL CONTROL DEVICE AND METHODS FOR ELECTROMECHANICAL CONTROL OF A BICYCLE

BACKGROUND OF THE INVENTION

A bicycle may be equipped with a transmission having a shifting system. The shifting system may be an electromechanical control system. Electromechanical control systems may be used to accurately and efficiently change between gear ratios of a bicycle transmission. Wireless electromechanical shifting systems may be used to decrease system complexity. For example, bicycles may be designed without need for routing of wires between components of the transmission. Aerodynamic and weight benefits may be realized as well, since use of wireless electromechanical shifting systems on aerodynamically designed frames minimize or eliminate the need to accommodate cable routing and thus can be made lighter and more streamlined. Internal or external frame features to route transmission conduits also need not be included.

The rider or mechanic may further benefit from a wireless control system. A wireless system may have components installed virtually anywhere on the bicycle or the rider. For instance, a time trial bicycle may have duplicate sets of wireless controls to facilitate use by the rider in various hand positions. Wireless control systems may also increase ease of installation, adjustment, and maintenance. For instance, wireless controls not connected by wires may be more easily installed, moved, and replaced than similar controls being routed to other components of the bicycle by wire.

Wireless electromechanical control systems balance power consumption and packaging against wireless communication performance. More efficient wireless communication performance facilitates lighter and more efficient packaging by having decreased power demand. A wireless receiver may be power cycled to limit power consumption relative to a constant power mode or configuration. Also, poor control of the power cycles of internal elements, such as processors, motors, and/or wireless communication devices can result in power use levels that are not ideal.

It is an object of the present disclosure to present signal transmission and reception protocols that improve the efficiency of wireless communication between components of a bicycle transmission. There is a need for a reliable, secure, and energy efficient wireless electromechanical control system for a bicycle.

SUMMARY

One aspect of the invention provides a wireless control system for a bicycle, having a switch device configured to move from a rest position, through a first actuation position, to a second actuation position. A control unit of the wireless control system has a control processor configured to generate a first signal responsive to movement of the switch device from the rest position to the first actuation position, the first signal configured to change a mode of a component of the bicycle and generate a second signal responsive to movement of the switch device from the first actuation position to the second actuation position, the second signal configured to trigger operation of the component of the bicycle.

Another aspect of the invention provides a wireless control system for a bicycle having a control assembly, a switch device disposed on the control assembly, a wireless communication device configured for responding to movement of the switch device, and a switch member constrained to move along a path. The path includes a first position at rest, a second position disposed a first actuation distance along the path, and a third position disposed a second actuation distance along the path. The wireless communication device changes to a ready mode responsive to the switch member achieving the second position and the wireless communication device transmits a signal responsive to the switch member achieving the third position.

Yet another aspect of the invention provides a method for wirelessly controlling a bicycle, comprising detecting, with a processor, a first movement of a switch device from a rest position to a first actuation position, changing a mode of a wireless communication device from a rest mode to a ready mode responsive to detecting the first movement, detecting, with the processor, a second movement of the switch device from the first actuation position to a second actuation position, and transmitting a signal with the wireless communication device responsive to detecting the second movement.

BRIEF DESCRIPTION OF THE DRAWINGS

Other aspects and advantages of the embodiments disclosed herein will become apparent upon consideration of the following detailed description, wherein similar or identical structures have similar or identical reference numerals.

DETAILED DESCRIPTION

Figure 1:
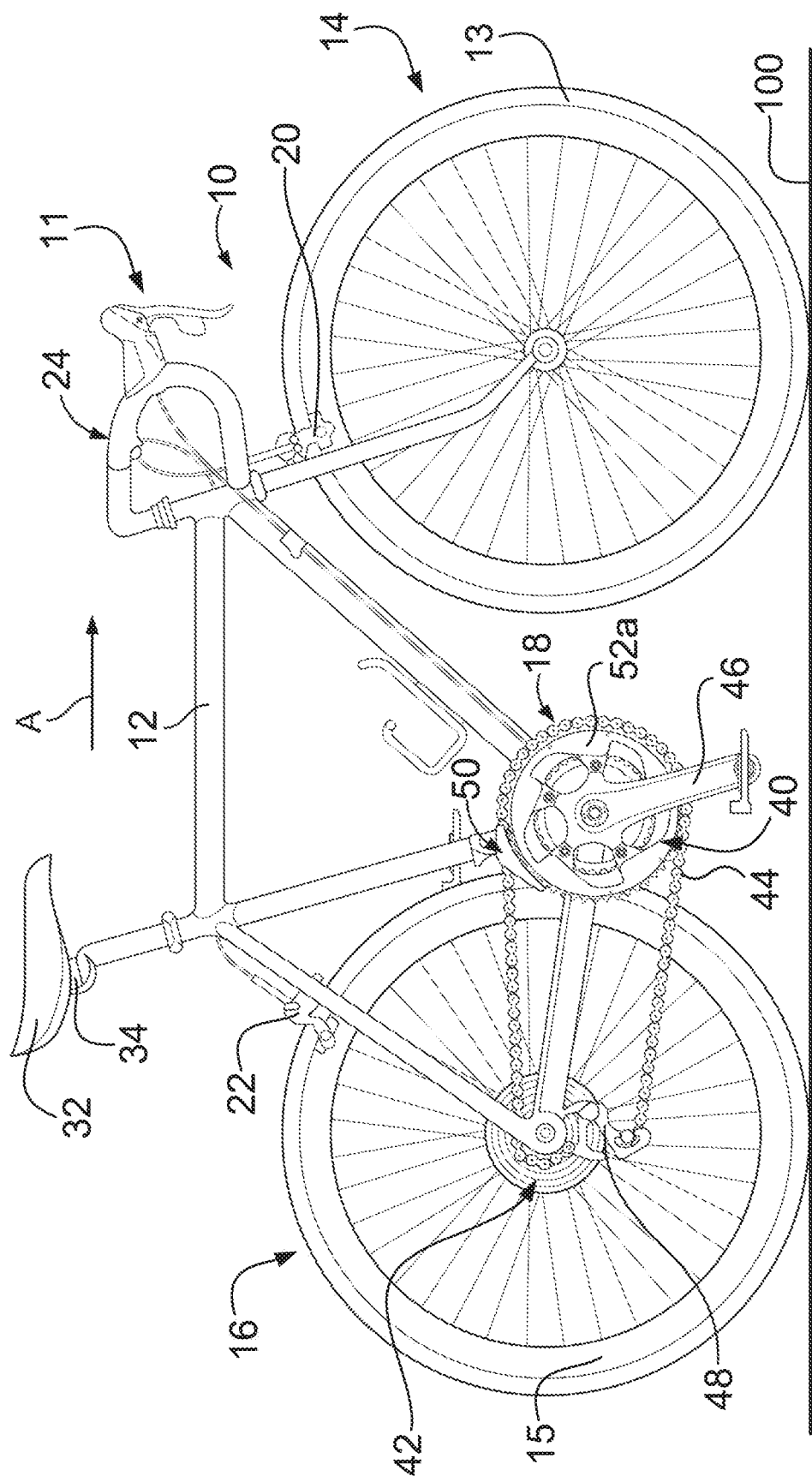
FIG. 1 is a side view of a road-type bicycle implementing an electromechanical control system.

Achieving more efficient wireless communication performance through changes in at least one of signal transmission or signal reception protocols may lead to more reliable control of the bicycle while maintaining similar power use constraints. A greater duty cycle for the wireless receiver can reduce latency at the expense of increased power consumption. If multiple signals are to be received in relative proximity to one another, the wireless receiver can be configured to increase its duty cycle upon receiving a single signal. It is contemplated that transmission of signals indicative of a rider's intention to command a shift imminently can result in the wireless receiver increasing duty cycle to reduce latency preemptively.

In an embodiment, a switch device may be configured to detect a necessary intermediate position between an initial, rest, or neutral position and an actuation or final position. For example, a switch device may be configured to have parts or components moved in a direction and/or constrained to move along a path. The switch device may be configured so as to detect an intermediate position on such a path, or along the direction of movement, between an initial or neutral position and a final position. As such, signals may be generated and/or actions caused based on the detection of both the intermediate position and the final position. This is beneficial for potentially coupled or tied actions of a sequential nature, such as powering a communication device and sending a signal with the communication device. Using a device as described herein sequential actions can be necessarily tied to the sequential nature of reaching the intermediate position and subsequently reaching the final position. Therefore, temporal efficiencies may be gained over triggering both actions based on reaching the final position of the switching device. More simply stated, a signal may be transmitted faster using a switch device as described herein than with the use of traditional switch devices. Other benefits of a switch device configured as described herein are also available.

Wireless control systems may be used to control one or more components of a bicycle. For example, a wireless control system may be used to control shifting, suspensioning, or movement of components of the bicycle. Wireless control systems may include one or more switches configured to effectuate control of the one or more components. One or more listening devices may be configured to respond to this control. Further, listening devices may include features, such as intermittent listening, in order to reduce power consumption. To reduce latency, the one or more switch may be configured to send an anticipation signal before sending an operation signal. The anticipation signal may be a plurality of anticipation signals. The operation signal may be a plurality of operation signals.

The anticipation signal may alert the one or more listening devices to an increased likelihood of the operation signal. In response, the one or more listening devices may be configured to listen constantly and/or reduce one or more rest gaps between periods of intermittent listening. The anticipation signal may additionally or alternatively be configured to change a transmitting device to a ready mode. For example, the anticipation signal may trigger a wireless communication device, such as a radio, to power on. The second signal may be a control signal which may then trigger the wireless communication device to transmit an operation signal configured to operate a component of the bicycle, for example a gear changer, which may also be a derailleur. Since changing the transmitting device to a ready mode may not be instantaneous, this use of the anticipation signal can facilitate a faster transmission from the wireless communication device responsive to user operation to generate the control signal. Using these techniques, as well as others disclosed herein, reduced latency wireless control may be achieved while maintaining efficient power consumption.

FIG. 1 generally illustrates a bicycle 10 of a road-type configuration with which a wireless control system may be used. The bicycle 10 includes a frame 12, front and rear wheels 14, 16 rotatably attached to the frame 12, and a drivetrain 18. A front brake 20 is provided for braking the front wheel 14 and a rear brake 22 is provided for braking the rear wheel 16. Each of the front and rear wheels 14, 16 includes a tire 13 attached to a rim 15, where the tire 13 is configured to engage the riding surface 100. A handlebar assembly 24 is provided for steering the front wheel 14. The direction of arrow "A" indicates a front and/or forward orientation of the bicycle 10. As such, a forward direction of movement for the bicycle 10 corresponds to the direction A.

Figure 2:
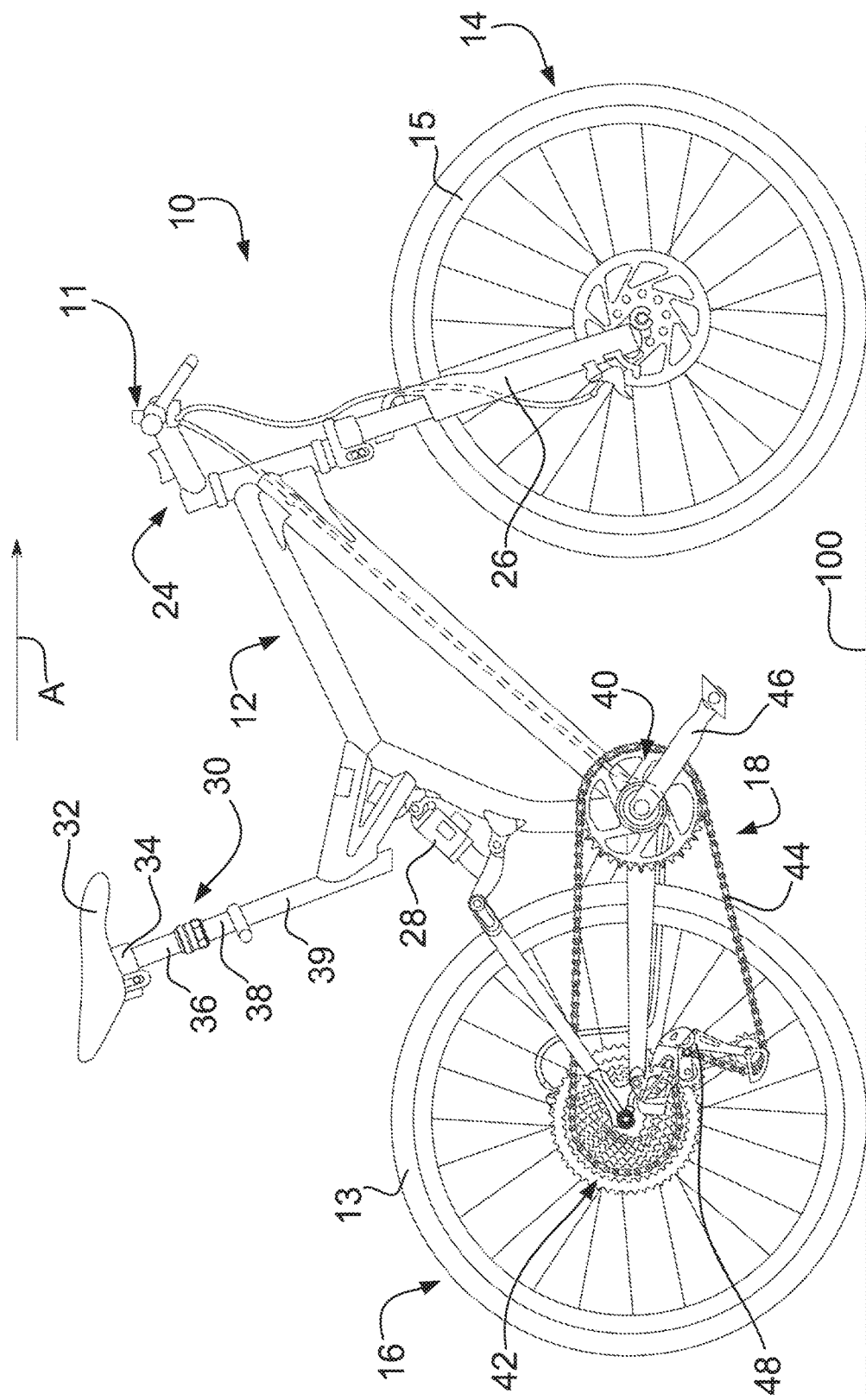
FIG. 2 is a side view of a mountain-type bicycle implementing an electromechanical control system.

Other configurations of the bicycle 10 are contemplated. For instance, FIG. 2 depicts the bicycle 10 having a mountain-type configuration. Potential differences between bicycles of various configurations include those depicted between FIG. 1 and FIG. 2. For example, FIG. 1 depicts the handlebar assembly 24 in a drop-type configuration, whereas the example in FIG. 2 has a flat-type configuration of the handlebar assembly 24. The example in FIG. 2 also includes a front suspension 26 for movably mounting the front wheel 14 to the frame 12 and a rear suspension 28 for movably mounting the rear wheel 14 to the frame 12. The front and rear suspensions 26, 28 may include one or more of an adjustable suspension component such as a spring or damper. An adjustable seating component 30 is also shown in this example configured to movably attach a saddle 32 to the frame 12. The adjustable seating component 30 may include a seat post head 34 attachable to the saddle 32 and connected to a seat post upper 36. The seat post upper 36, the seat post head 34, and the saddle 32 may be configured to move relative to a seat post lower 38 fixably attached to the frame 12. For instance, the seat post upper 36 may ride within the seat post lower 38, where the seat post lower 38 is fixed to a seat tube 39 of the frame 12.

Figure 4:
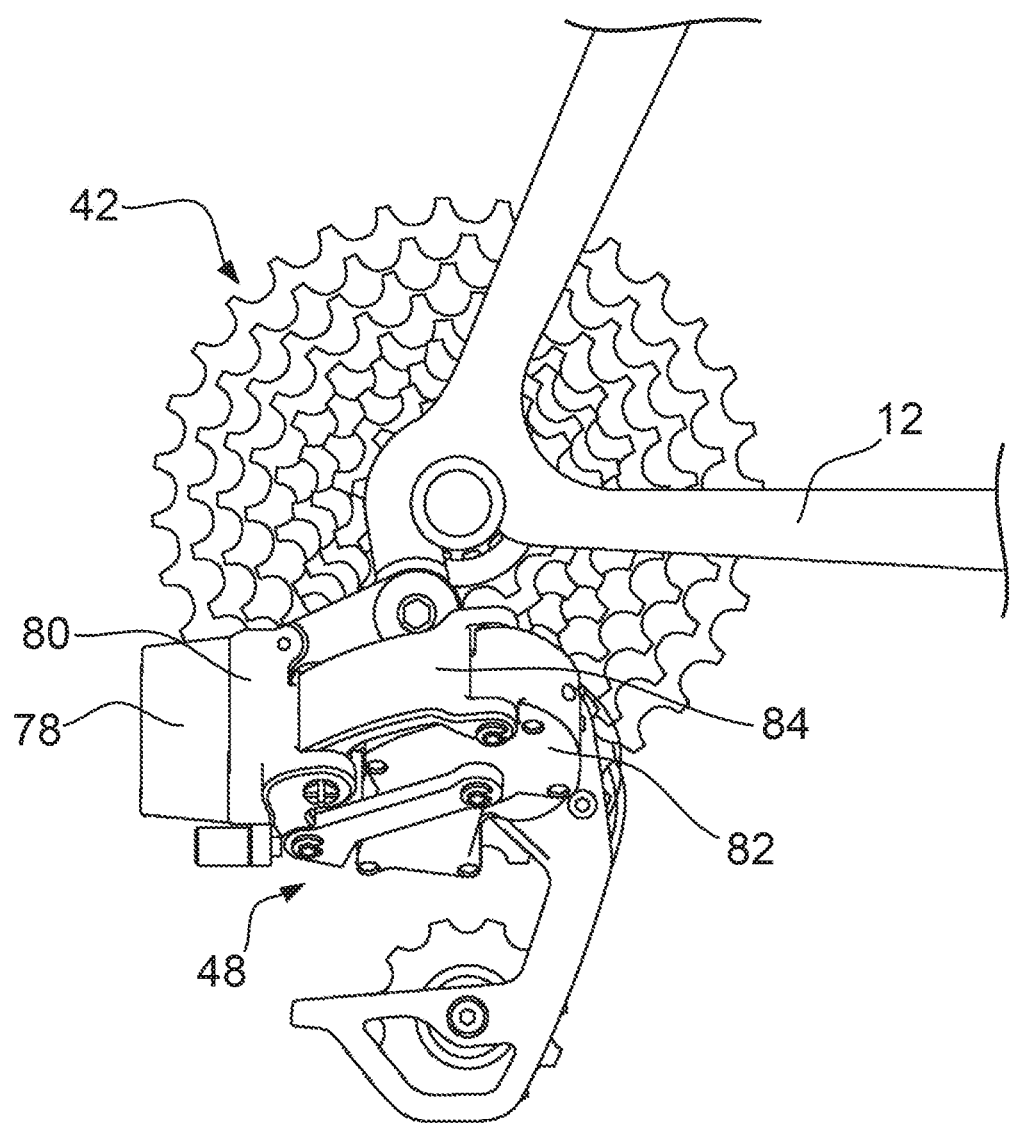
FIG. 4 is a side view of an embodiment of a rear gear changer attached to a bicycle.
Figure 5:
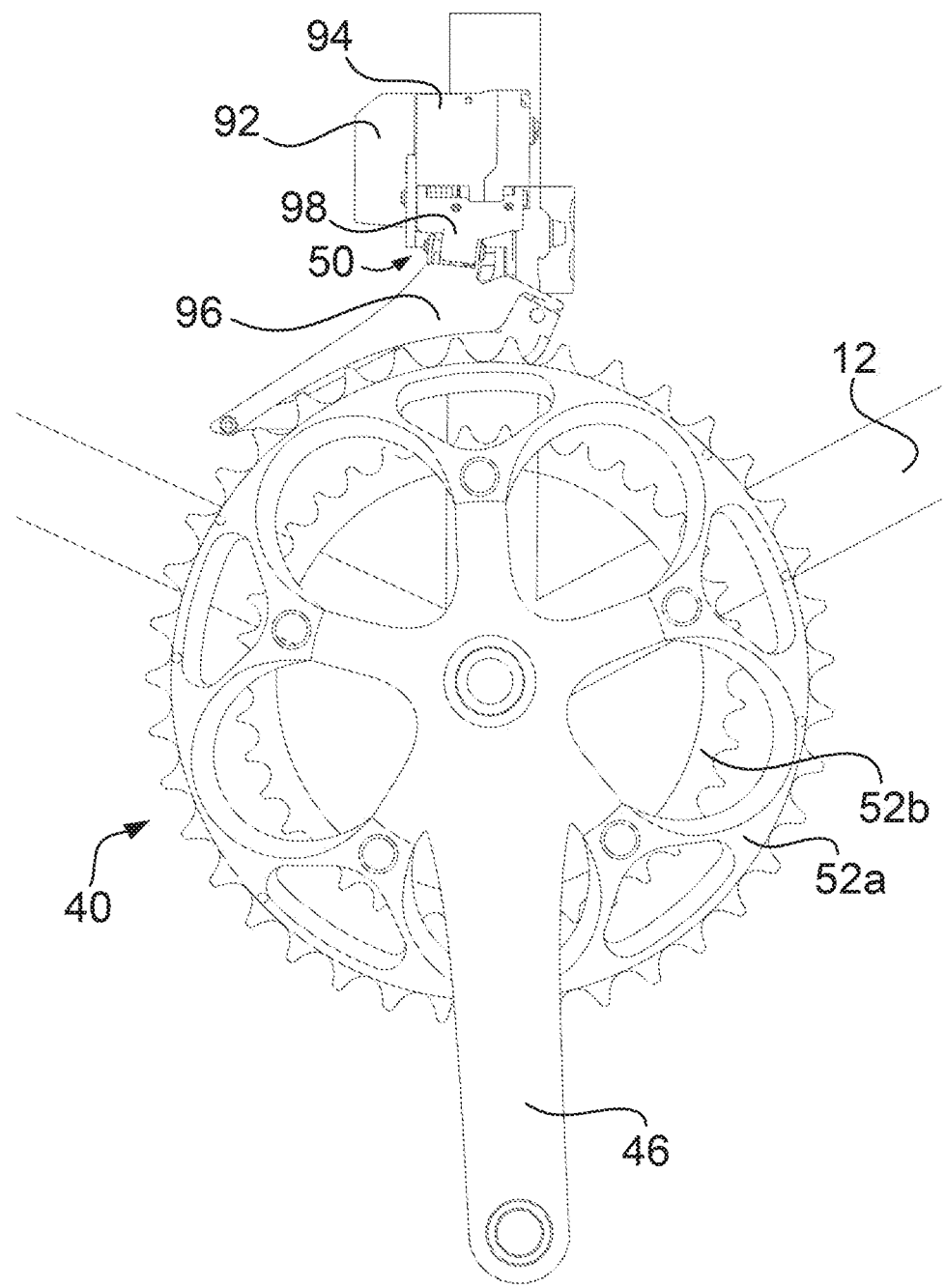
FIG. 5 is a side view of an embodiment of a front gear changer attached to a bicycle.

FIGS. 1 and 2 each depict an embodiment of the drivetrain 18 including a chainring assembly 40 rotatably mounted to the frame 12, a sprocket assembly 42 mounted to the rear wheel 16, and a chain 44 engaging the chainring assembly 40 and the sprocket assembly 42. The chainring assembly 40 may be attached to a crank arm 46 to facilitate torque transfer from a rider to the rear wheel 16 through the chainring assembly 40, to the chain 44, and to the sprocket assembly 42. The chain 44 may be shifted through a plurality of sprockets of the sprocket assembly 42 with a rear gear changer 48 as depicted in FIG. 4. The chain 44 may also be shifted through a plurality of chainrings of the chainring assembly 40 with a front gear changer 50 as depicted in FIG. 5. Alternatively, as in FIG. 2, the front gear changer 50 may be omitted as when the chainring assembly 40 consists of one of a chainring 52.

Figure 3A:
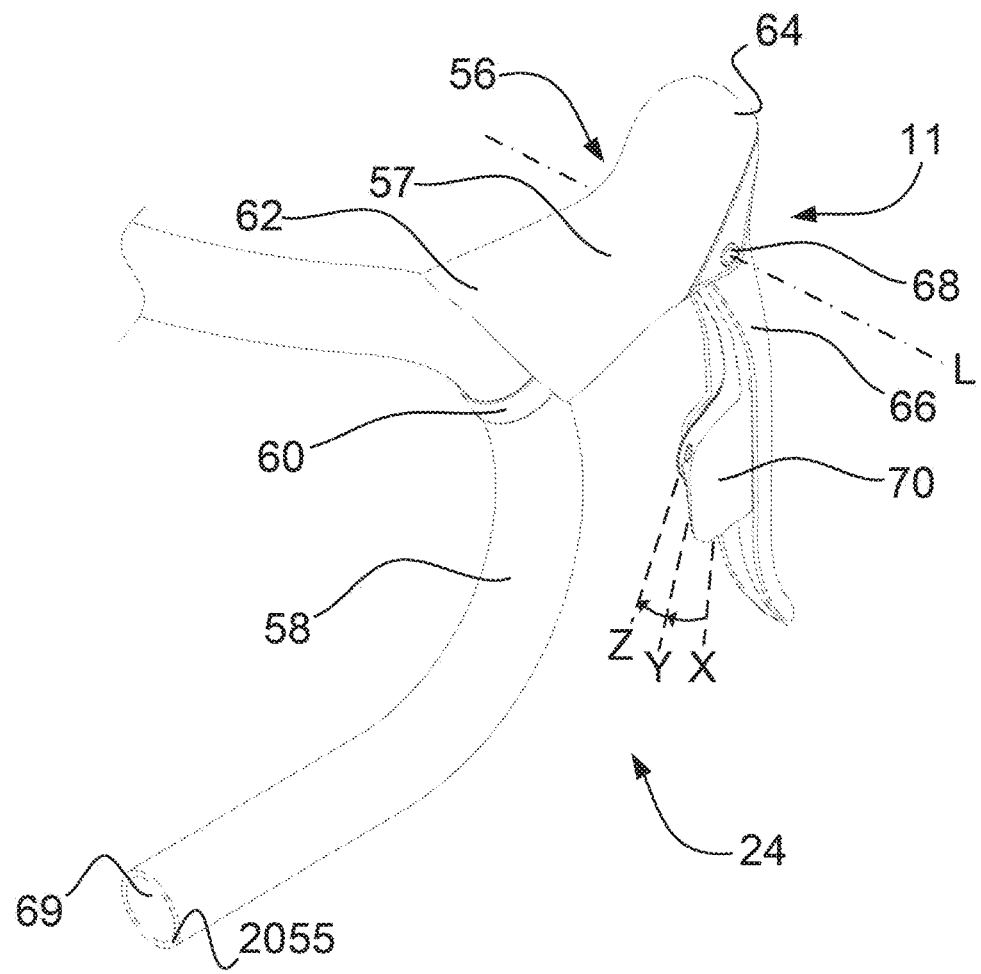
FIG. 3A is an isometric view of an embodiment of a control assembly attached to a drop style handlebar conventionally used on road-type bicycles.
Figure 3B:
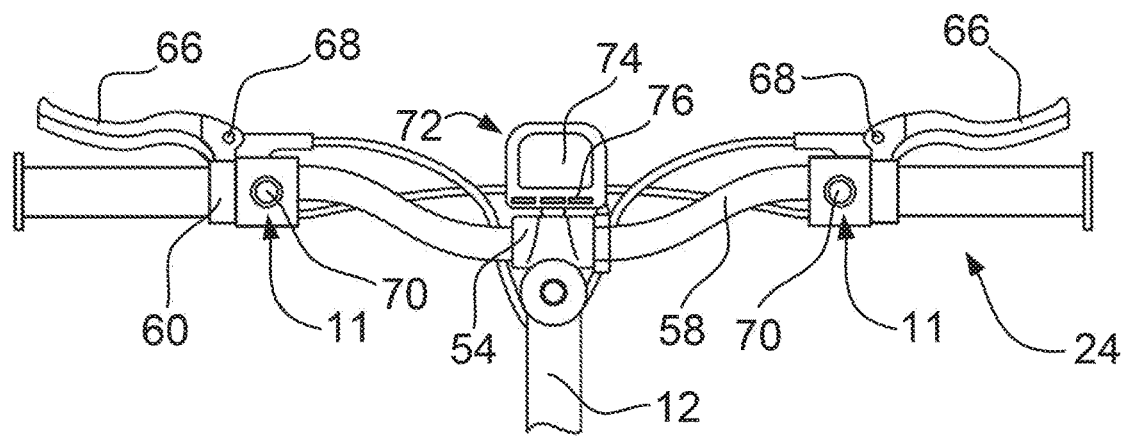
FIG. 3B is a top view of an embodiment of a pair of control assemblies attached to a flat style handlebar conventionally used on mountain-type bicycles.

Each of FIGS. 1 and 2 depict an embodiment of a control assembly 11 for controlling components of the bicycle. FIG. 3A further depicts an embodiment of a road-type configuration of the control assembly 11 as in FIG. 1. FIG. 3B further depicts an embodiment of a mountain-type configuration of the control assembly 11 as in FIG. 2. The control assembly 11 may be a plurality of control assemblies. For example, a pair of control assemblies 11 may be used. Other embodiments of the control assembly 11 are contemplated, for instance in a triathlon or time trial application where a first pair of control assemblies 11 may be used on extensions (not shown) of the handlebar assembly 24 and a second pair of control assemblies may be used adjacent the brake levers 66. Additionally, the embodiments shown may be employed on various configurations of the bicycle 10. For example, the control assembly 11 of FIG. 3B may be employed on the handlebar assembly 24 of FIG. 3A. The control assembly 11 may also be mounted elsewhere on the bicycle 10. For example, an embodiment of the control assembly 11 may be mounted to a stem 54, where the stem 54 is configured to attach the handlebar 58 to the frame 12.

The embodiment of FIG. 3A includes a control assembly 11 having a hood portion 56 mounted to a handlebar 58 with an attachment member 60 connected to a first end 62 of the hood portion 56. The attachment member 60 may be a clamp as shown or may be otherwise attachable, for instance through threaded engagement with the handlebar 58. The hood portion 56 includes a second end 64 attached to the brake lever 66. The hood portion 56 is configured to support rider hand placement forward of the handlebar 58 between the first and second ends 62, 64. The hood portion 56 may have a hood cover 57 configured to facilitate gripping of the hood portion 56 by the rider. The hood cover 57 may be elastomeric and/or removable for service. The brake lever 66 may be pivotable about a lever axis L. For example, a lever pivot 68 may pivotably connect the brake lever 66 to the hood portion 56. The control assembly 11 is shown to further include a switch device 70. The switch device 70 may be a button, lever, or other implement controllable by a rider. The switch device 70 may be a plurality of controls. For example, two of the switch device 70 may be used on one of the control assemblies 11.

Figure 8:
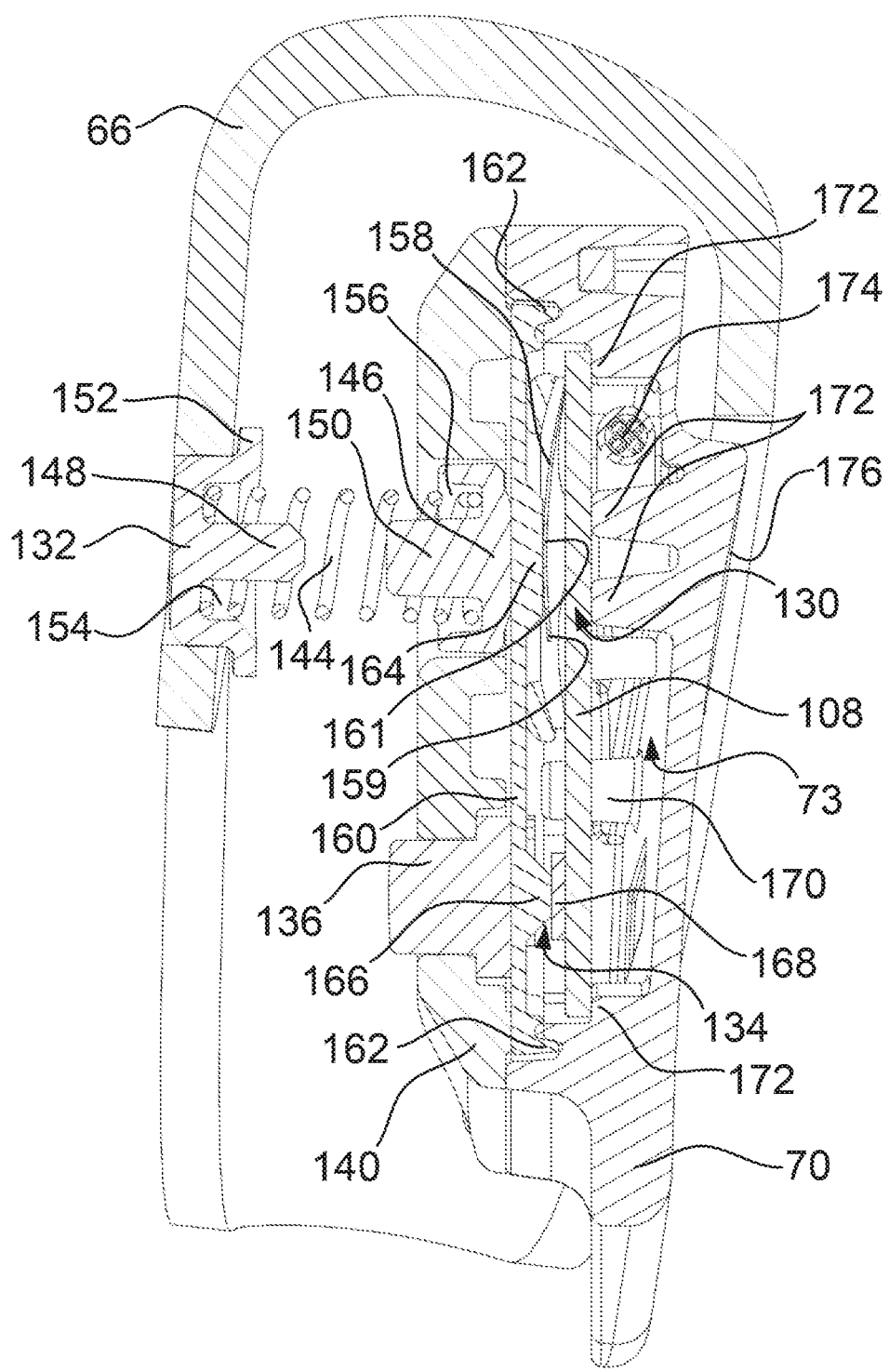
FIG. 8 is a sectional view of a component of the control assembly of FIG. 6 in a non-actuated state.
Figure 9:
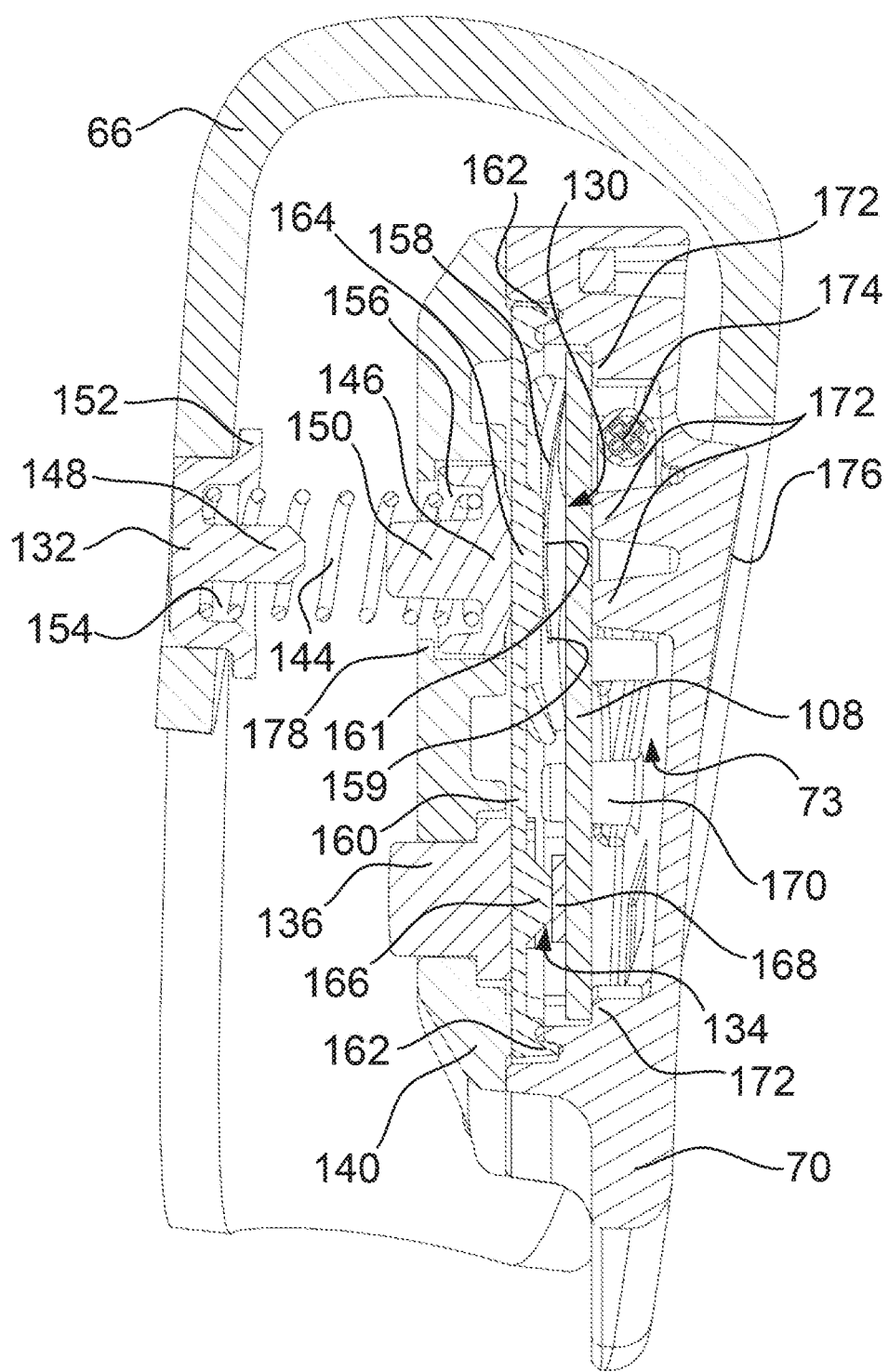
FIG. 9 is a sectional view of an alternative embodiment of the component of the control assembly of FIG. 8 in a non-actuated state.
Figure 10:
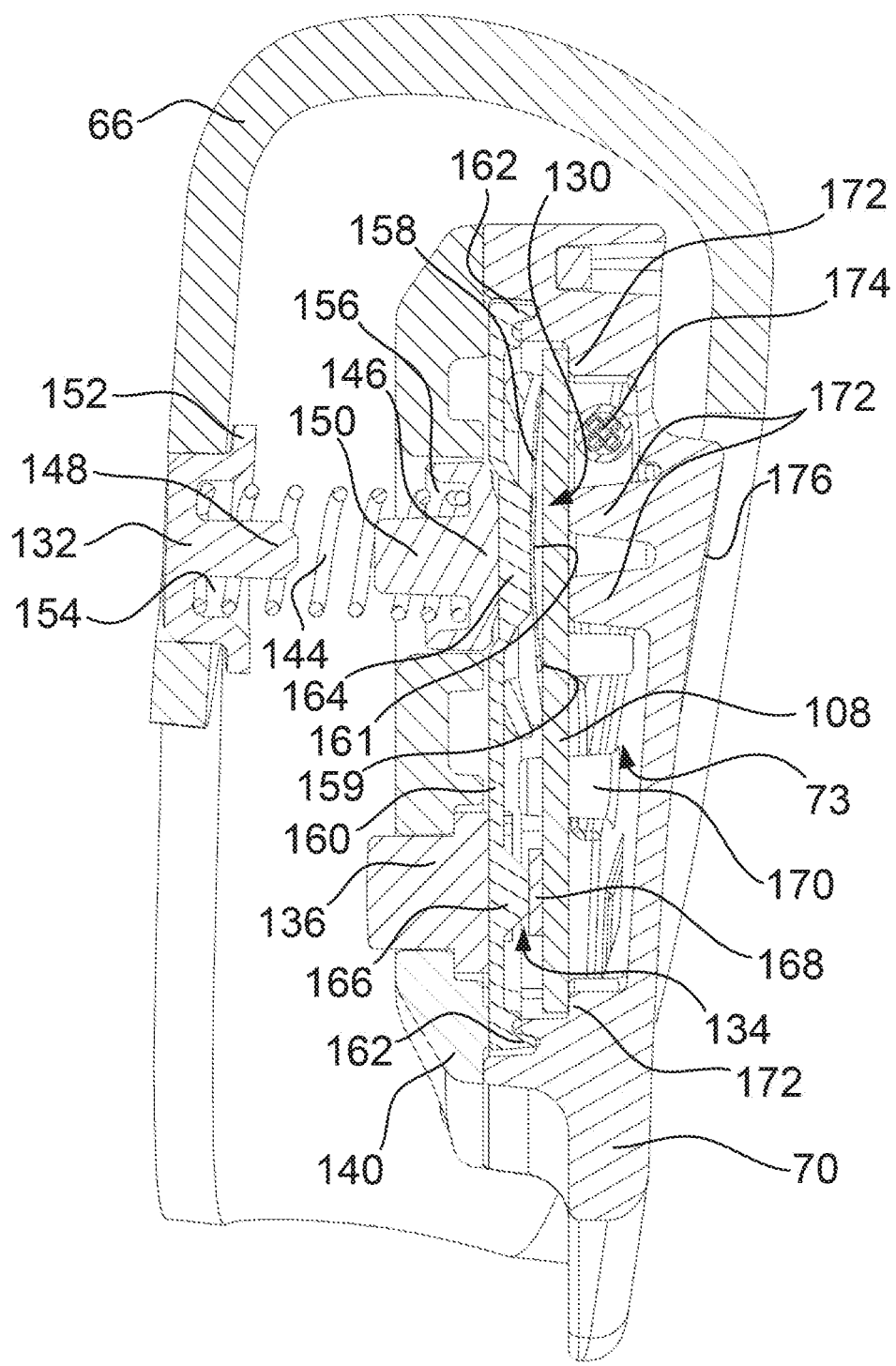
FIG. 10 is a sectional view of the component of the control assembly of FIG. 8 in a first actuated state.

The switch device 70 depicted in FIG. 3A is pivotable about the lever axis L and rotatably fixed with the brake lever 66 about lever axis L. The switch device 70 may be configured to be a component of the brake lever 66 or may alternatively be distinct or disconnected from the brake lever 66. For instance, the switch device 70 may be pivotable about the lever axis L independently from the brake lever 66. The switch device 70 may be movable into a plurality of positions. For example, the switch device 70 may have a rest position X as shown in FIG. 8, a first actuation position Y as shown in FIG. 9, and a second actuation position Z as shown in FIG. 10. The rest position X may be referred to as a first position, the first actuation position Y may be referred to as a second position, and the second actuation position Z may be referred to as a third position. Each of the positions X, Y, and Z of the switch device 70 may correspond to an axial movement of the switch device 70 of different distances along the lever axis L or alternatively a rotational movement through an arc about a point defined on the lever axis L. For example, a first distance may be defined between positions X and Y and a second distance may be defined between positions X and Z. A path may describe the movement of the switch device as in FIG. 3A. For example, the positions X, Y, and Z may be defined along the path between positions X and Z. The brake lever 66 may move with the switch device 70 or else the switch device 70 may move relative to the brake lever 66.

FIG. 3B depicts a top view of an embodiment of a mountain-type configuration of the handlebar assembly 24. The embodiment in FIG. 3B includes a user device 72 disposed between two of the switch device 70. The user device 72 may be configured to communicate electronically with at least one of the switch devices 70. The user device 72 is shown connected to the handlebar 58, but may be connected to other components of the bicycle 10, such as the stem 54 or the frame 12. Alternatively, the user device 72 may be removed from the bicycle 10, for instance as a worn or carried device.

Circuitry of the control assembly 11 configured to transmit and/or receive signals may be integrated with the switch device, or may be remotely located, such as in the user device 72. The user device 72 may be employed to consolidate components of a plurality of the control assembly 11. For example, the user device 72 may have circuitry that includes transmission and/or reception components that may be included on the control assembly 11 in other embodiments. The user device 72 may also include a control user interface 74. The control user interface 74 may be a display and may be configured to represent status of components and/or may include an interface to control or adjust components. For instance, the control user interface 74 may be a touch screen. Alternatively or additionally, the user device 72 may include one or more of a user device button 76 to control or adjust components.

The example in FIG. 3B depicts an embodiment of the control assembly 11 and the attachment member 60 disposed on opposite sides the handlebar 58. The control assembly 11 may be attached to the handlebar 58 with the attachment member 60 or may be otherwise attached. For example, the control assembly 11 may be attached to the handlebar 58 independently of the brake lever 66. Each embodiment of the control assembly 11 is shown to have a single embodiment of the switch device 70. However, another embodiment of the wireless control system may include more than one of the switch devices 70 on one or more of the control assemblies 11. For example, one of the control assemblies 11 may include two of the switch devices 70 arranged in opposition as on a rocker switch and the other of the control assembly 11 may include a single embodiment of the switch device 70.

Figure 6:
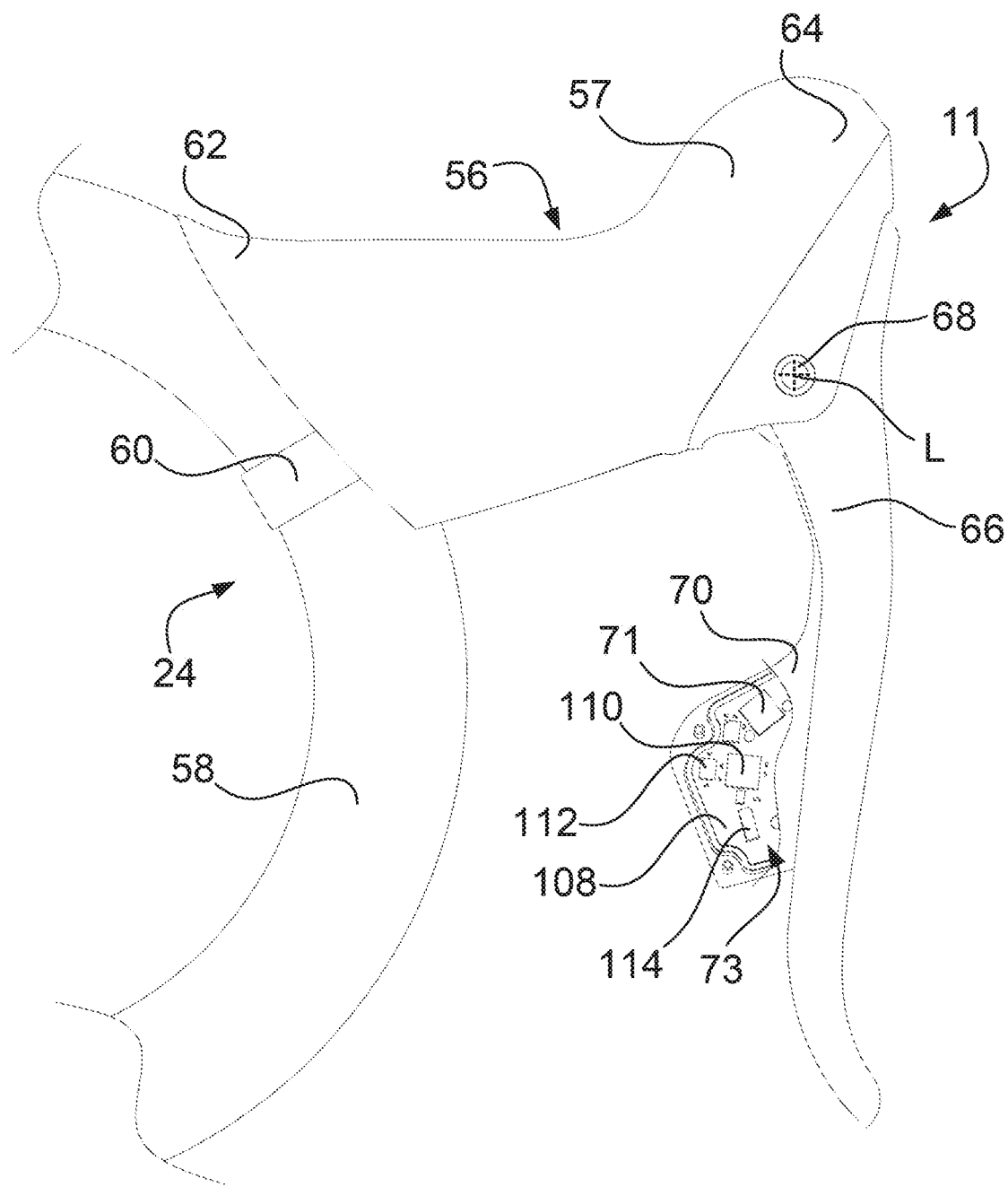
FIG. 6 is a partial sectional view of an embodiment of a control assembly.

The control assembly 11 may include wireless communication components to control other components of the bicycle 10. For example, the control assembly 11 may include a control communication device 71, as shown in FIG. 6, configured to transmit operation signals responsive to actuation of the switch device 70. The control communication device 71 may be further configured to send signals responsive to actuation of the switch device 70. The control communication device may be configured to send first signals responsive to the first actuation position Y and second signals responsive to the second actuation position Z. In one example, actuation of the switch device 70 to the first actuation position Y may send anticipation signals from the control communication device 71 and actuation of the switch device 70 to the second actuation position Z may send operation signals from the control communication device 71.

The control communication device 71 may also be configured to respond to various signals. For example, a control processor 110 may be configured to generate signals in response to actuation of the switch device 70. In an embodiment, the control processor 110 generates a signal configured to change a mode of the control communication device 71. The control processor 110 may generate an anticipation signal responsive to the first actuation position Y configured to change the control communication device 71 to a ready mode. The anticipation signal may be configured to wake up, turn on, or transition the control communication device 71 to a higher power use state. The control processor 110 may also generate a control signal configured to trigger the control communication device 71 to transmit a signal. The control processor 110 may enter a transmit mode upon trigger to transmit a signal. The control communication device 71 may be responsive to transmit the operation signal to control a component of the bicycle 10.

Other components of the bicycle 10 may be configured to respond to various signal types. For example, components may be configured to respond differently to first signals and second signals transmitted by the control communication device 71. In an embodiment, a component such as the rear gear changer 48 and/or the front gear changer 50 is configured to perform a first action responsive to transmission of the first signal and to perform a second action responsive to transmission of the second signal. In another embodiment, the control communication device 71 is configured to enter the ready mode responsive to the first signal and transmit an operation signal responsive to the second signal.

One signal may trigger various operations of one or more component of the bicycle 10. For example, the control processor 110 may generate the first signal responsive to the first actuation position Y, the first signal being configured to change the mode of the control communication device 71 to the ready mode and to trigger the control communication device 71 to transmit the anticipation signal, as in the transmit mode. The anticipation signal may then trigger a component such as the front gear changer 50 or the rear changer 48 to listen for an extended period of time. The control processor 110 may then generate the second signal responsive to the second actuation position Z to trigger the control communication device 71 to transmit an operation signal configured to trigger operation of the component. For example, the operation signal may be configured to control an upshift or a downshift of the front and/or rear gear changers 40, 48.

Referring now to FIG. 4, various embodiments of the device may include the rear gear changer 48 shown to control movement of the chain 44 between sprockets of the sprocket assembly 42. The rear gear changer 48 depicted in FIG. 4 includes a rear power source 78. The rear power source 78 may be a battery, which may be rechargeable. The rear power source 78 is shown attached to a rear base member 80 of the rear gear changer 48, but may be located on another part or parts of the rear gear changer 48 or on the frame 12. The rear base member 80 attaches to the frame 12 and is connected to a rear movable member 82 of the rear gear changer 48 by a rear linkage 84 of the rear gear changer 48. The rear movable member 82 is configured to move relative to the rear base member 80 responsive to force as may be supplied by a rear motor.

The rear motor may be included with the rear gear changer 48 to supply force to move the rear movable member 82. A rear processor may be included to control the rear motor in order to execute shifts up or down the sprocket assembly 42. The rear processor may be responsive to signals generated by the control assembly 11. For example, the control communication device 71 of the control assembly 11 may wirelessly communicate with a rear communication device associated with the rear processor. The rear communication device may be a radio or any other device configured to communicate with the control communication device 71. In an embodiment, communication between the rear communication device and the control communication device may be wireless.

Referring now to FIG. 5, various embodiments of the device may include the front gear changer 50 shown to control movement of the chain 44 between the chainrings 52*a*, 52*b* of the chainring assembly 40. The front gear changer 50 depicted in FIG. 5 includes a front power source 92. Alternatively, the front gear changer 50 may use a common power source. For example, the front gear changer 50 and the rear gear changer 48 may have a wired connection therebetween such that both of the gear changers 48, 50 draw power from the rear power source 78, the front power source 92, or a central power source (not shown).

The front gear changer 50 includes a front base member 94 connected to the frame 12 and a front movable member 96 movably connected to the front base member 94 by a front linkage 98. The front power source 92 may supply power to a front motor. The front motor is configured to apply torque to components of the front gear changer 50 in order to move the front movable member 96 relative to the front base member 94. In such a way, the front gear changer 50 may shift the chain 44 between the chainrings 52*a*, 52*b* of the chainring assembly 40.

The chainring assembly 40 shown includes a first chainring 52*a* and a second chainring 52*b*. A different number of chainrings may be employed. For example, three chainrings may be employed. Alternatively, a single of the chainring 52 may be employed, in which case the front gear changer 50 may be omitted, as shown in FIG. 2.

A front processor may be included to control the front motor in order to execute shifts up or down the chainring assembly 40. The front processor may be responsive to the control assembly 11. For example, the control communication device 71 of the control assembly 11 may wirelessly communicate with a front communication device associated with the front processor. The front communication device may also be configured to wirelessly communicate with the rear communication device associated with the rear processor. For example, the rear communication device may send signals received by the front communication device. In this example, the front communication device may increase listening activity responsive to receiving signals from the rear communication device. The front communication device may be a radio or any other device configured to communicate with the control communication device 71.

FIG. 6 shows a partial cutaway view of the control assembly 11 as mounted to the handlebar 58. The switch device 70 is shown in partial cutaway such that a control unit 108 can be seen. The switch device 70 may include a control compartment 73 configured to house the control unit 108. The control compartment 73 may be sealed from environmental factors to protect components of the control unit 108.

In an embodiment, the control compartment is constructed substantially from radio frequency transparent materials.

The control unit 108 is shown to include the control communication device 71 and the control processor 110. The control unit 108 may include a printed circuit board ("PCB") having circuitry for interpreting actions, generating signals, and/or transmitting signals. Alternatively, the control unit 108 may be omitted and components associated therewith may be otherwise connected. For example, flexible connectors such as wires may be used.

The control unit 108 is shown in a PCB configuration. The shown PCB embodiment of the control unit 108 has a substrate to which components of the control unit 108 are applied and/or attached. The substrate may form the structure and/or shape of the control unit 108. The substrate may be any substance operable to form the underlying attachment of the components of the control unit 108, such as a dielectric composite material. For example, composites such as phenolic cotton paper (e.g. FR-2), cotton paper and epoxy (e.g. FR-3), glass-reinforced epoxy (e.g. FR-4, FR-5, FR-6), and/or other materials as well as combinations thereof, may be used. The substrate may be rigid or flexible.

Connection of circuitry to the control unit 108 may be accomplished using various techniques. In an embodiment, connection is accomplished through application of a layer of an electrically conductive medium, such as solder, between electrical contact connection surfaces of the control unit 108. Such connection may provide electrically communicative contact between electronic components connected to the control unit, such as the control communication device 71 and the control processor 110.

The control unit 108 may be configured to resist an actuation force. For example, the control unit 108 may be sized and shaped to fit closely within an opening of the switch device 70 so as to reduce movement therein. The control unit 108 may be further sized and shaped to resist deformation or displacement within the switch device 70 when a force is applied to the control unit 108. The control unit 108 may also be adhesively mounted and/or secured with fasteners.

The control unit 108 includes the control processor 110 and a control memory 112. The control processor 110 may include a general processor, a digital signal processor, an application specific integrated circuit ("ASIC"), a field programmable gate array ("FPGA"), an analog circuit, a digital circuit, combinations thereof, or other now known or later developed processor. The control processor 110 may be a single device or a combination of devices, such as through shared or parallel processing.

The control memory 112 may be a volatile memory or a non-volatile memory. The control memory 112 may include one or more of a read only memory ("ROM"), a random access memory ("RAM"), a flash memory, an electronic erasable program read only memory ("EEPROM"), or another type of memory. The control memory 112 may be removable from the control unit 108, such as in a secure digital ("SD") memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The control memory 112 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The control unit 108 is operable to interpret a signal indicative of a shift command generated in response to operation of the switch device 70.

In accordance with various embodiments of the present disclosure, methods described herein may be implemented with software programs executable by a computer system, such as the control unit 108, the rear gear changer 48, and/or the front gear changer 50. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry (e.g., an FPGA or an ASIC).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data (e.g., magnetic, magneto optical disks, or optical disks). However, a computer need not have such devices. Moreover, a computer can be embedded in another device, for example, a mobile telephone, a personal digital assistant ("PDA"), a mobile audio player, a Global Positioning System ("GPS") receiver, a control unit 108, a rear gear changer 48, or a front gear changer 50, to name just a few. Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD-ROM and DVD-ROM disks. The processor and the memory can be supplemented by, or incorporated in, special purpose logic circuitry.

The control communication device 71 provides for data and/or signal communication from the control unit 108 to another component of the bicycle, or an external device such as a mobile phone or other computing device. The control communication device 71 communicates the data using any operable connection. An operable connection may be one in which signals, physical communications, and/or logical communications may be sent and/or received. An operable connection may include a physical interface, an electrical interface, and/or a data interface. The control communication device 71 may be configured to communicate wirelessly, and as such include one or more antennae. The control communication device 71 provides for wireless communications in any now known or later developed format.

A control antenna 114 may also be provided. The control antenna 114 may be a plurality of control antennae. As illustrated in FIG. 6, the control unit 108 includes an antenna included with the circuitry of the PCB, however additional antennae may also be included in the circuitry. The control antenna 114 may be integrated with another component of the bicycle or may be an independent component. For example the control antenna 114 may be integrated as part of the control communication device 71 and/or as part of the brake lever 66.

Figure 7:
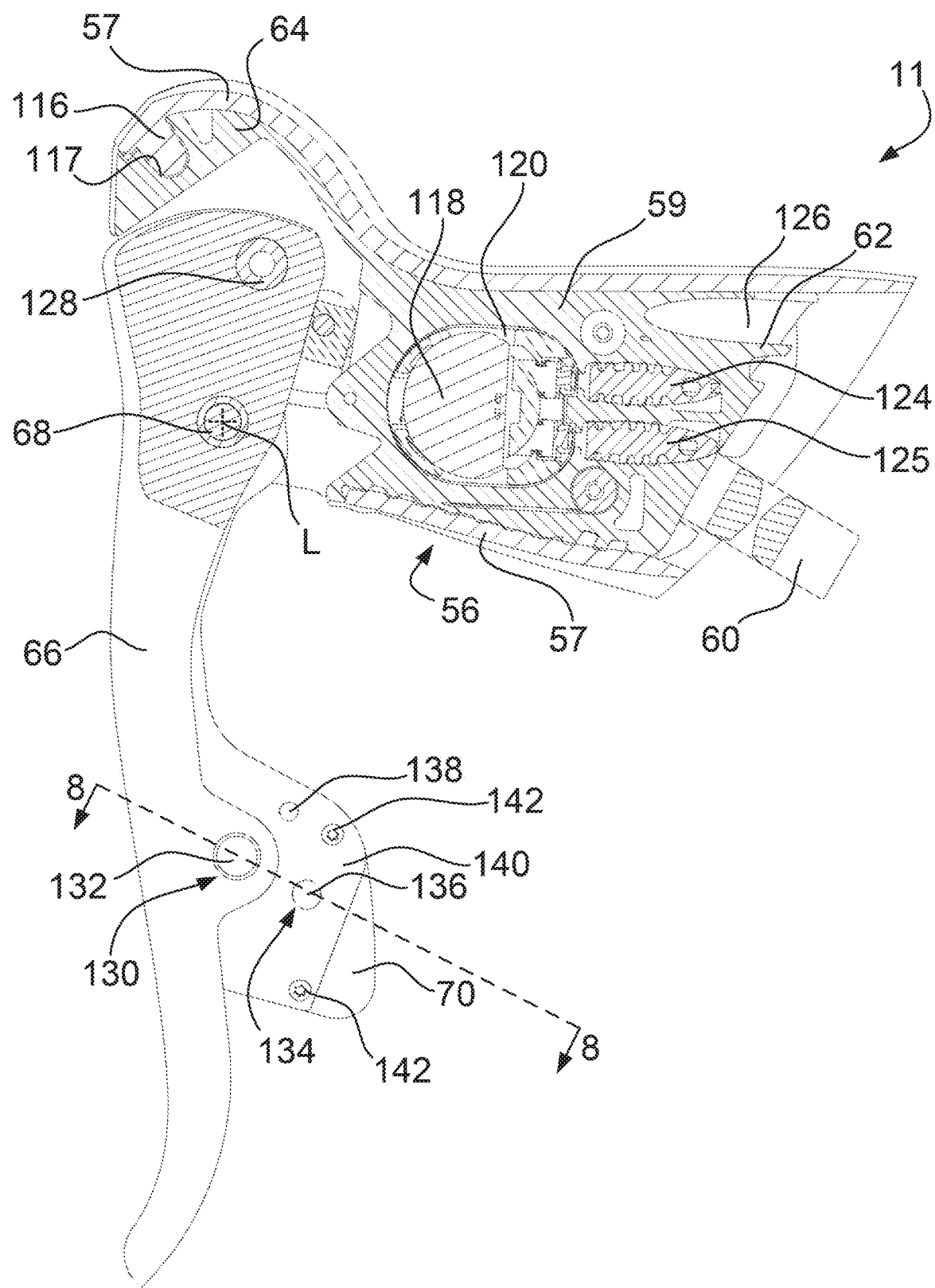
FIG. 7 is another partial sectional view of the control assembly of FIG. 6.

FIG. 7 is another partial sectional view of the control assembly 11 of FIG. 6. The view in FIG. 7 shows the control assembly 11 from the opposite side shown in FIG. 6. The hood portion 56 of the control assembly 11 is shown with the hood cover 57 encompassing a hood body 59. The hood body 59 is intended as a gripping portion, where the hood cover 57 provides contact surface for a rider's hand. The hood cover 57 may be permanently or removably attached to the hood body 59 or may be integral with the hood body 59. For example, the hood body 59 may be overmolded with the hood cover 57. In an alternative embodiment, the hood cover 57 may have one or more of a hood attachment features 116. The hood attachment feature 116 may be used to anchor the hood cover 57 to the hood body 59. For example, the hood attachment feature 116 may interact with a cover catch 117 in order to anchor the hood cover 57 to the hood body 59.

The hood body 59 may be of any suitable material. For example, the hood body 59 may be of metal, plastic, and/or composite construction. The hood body 59 is constructed to carry, house, and/or support various mechanisms. For example, the hood body 59 is shown to enclose a control power source 118.

The hood cover 57 may be made of any suitable material, such as natural and/or synthetic elastomeric materials. For example, the hood may be constructed from a thermoplastic elastomer such as Santoprene™. The hood cover 57 may be designed to present a comfortable interface for the user and to reduce the tendency to become detached or moved from its position relative to the hood body 59. The hood cover 57 may be configured to be removably attached to and held in position on the hood body 59, for instance using a plurality of the hood attachment features 116.

The control power source 118 is shown disposed in a hood compartment 120 of the hood body 59. The hood compartment 120 is sized and shaped to house the control power source 118 and optional other components, mechanisms, connectors, and the like. The control power source 118 may be a battery, such as a coin cell. The hood compartment 120 may be accessed through a hood compartment cover (not shown) which may be held in place with screws or other fasteners.

The attachment member 60 may be provided to mount the control assembly 11 to the handlebar 58. For example, the attachment member 60 may be threadably attached to the hood body 59 such that tightening the attachment member 60 closer to the hood body 59 urges the hood body 59 together with the handlebar 58.

The brake lever 66 may include one or more components of a first switch assembly 130. For example, the brake lever 66 may include a first switch lever protrusion 132. The first switch lever protrusion 132 may be attached to, formed on, or otherwise provided on the brake lever 66. The first switch lever protrusion 132 may be in the form of a post, boss, cylinder, or the like. The first switch lever protrusion 132 may interact with other components of the first switch assembly 130.

The first switch assembly 130 may be operable to generate anticipation, operation, and/or control signals. In an embodiment, the first switch assembly 130 is operable through actuation of the switch device 70. For example, operation of switch device 70 may selectively close or open one or more circuits in the first switch assembly 130. In an embodiment, the first switch assembly 130 may be configured to close a first circuit at a first actuation position and close a second circuit at a second actuation position, beyond the first actuation position. In an embodiment, the switch device 70 is configured to move in a same direction from a rest or neutral position to both the first actuation position and the second actuation position. For example, the switch device 70 is configured to rotate about and axis with the first actuation position and the second actuation position as discrete locations along the movement of the switch device 70.

A mode assembly 134 may also be provided. The mode assembly 134 may be operable to generate mode signals. For example, the mode assembly 134 may include a mode actuator 136 operable to close a mode circuit. The mode actuator 136 may be a type of switch. For example, the mode actuator 136 may be a momentary switch, such as a button, or may be a toggle switch. The mode actuator 136 may alternatively operate without closing a circuit. For example, the mode actuator 136 may be operable to select an alternate state of a processor.

Accessory connections may be provided. For example, a first accessory connection 124 and a second accessory connection 125 may be formed in the hood body 59. The first and second accessory connections 124, 125 may facilitate external accessories to be electrically connected to the control power source 118 and/or the control unit 108. One example of such an accessory is a remote electrical switch, such as a dome switch configured with a connective coupling, or jack connection, operable to couple with the accessory connections 124, 125.

A brake connection 126 may also be provided. The brake connection 126 may be configured for connecting to cable or hydraulically actuated brakes. The brake lever 66 may include a brake pivot 128. The brake pivot 128 may be configured to receive a brake cable head (not shown) in order to pull a brake cable (not shown) to actuate the front and/or rear brake 20, 22. The brake pivot 128 may also control the actuation of a brake master cylinder (not shown) as in a hydraulic braking configuration. The brake cable (not shown) or a hydraulic hose (not shown) may be configured to pass through the brake connection 126.

In an embodiment, the control unit 108 includes an indicator regarding activity, actions, or status of the control unit 108. In an embodiment, the control unit 108 includes a visual indicator 138. For example an LED indicator configuration of the visual indicator may be provided. In an embodiment, the visual indicator 138 lights to indicate input of commands or other actions of the control unit 108. The visual indicator 138 may be located on the bicycle 10 to facilitate indication of one or more states of a component or components of the bicycle 10 to a rider or mechanic.

The switch device 70 may include one or more of a control fastener 142 configured to connect the switch device 70 with a control cover 140. For example, four control fasteners 142 may be provided. In an embodiment, the control fasteners 142 are screws configured to pass through the control cover 140 and threadably engage the switch device 70. Also in an embodiment, the control fasteners 142 are configured to bring the switch device 70 and the control cover 140 into sealing engagement to seal the control compartment 73.

FIG. 8 is a sectional view of the switch device 70, the brake lever 66, and associated components of FIG. 7, taken along cut line 8-8. The switch device 70 is shown spaced apart from the brake lever 66 by a bias device 144. The bias device 144 may be configured to set a non-actuated, neutral, or rest position of the switch device 70 relative to the brake lever 66. For example, the bias device 144 may urge the first switch lever protrusion 132 of the brake lever 66 away from a first switch control protrusion 146. In an embodiment, the bias device 144 is a coil spring. Alternatively, the bias device 144 may be integrated with another component. For example, the bias device 144 may be unitary or integrated with the control, such as in a leaf spring configuration. A unitary configuration of the bias device 144 may be one of a dome switch, leaf spring, coil spring, or other configuration. A bias stop (not shown) may be provided to limit spacing apart of the first switch lever protrusion 132 from the first switch control protrusion 146 by the bias device 144.

The first switch lever protrusion 132 may be separate from or integrated with the brake lever 66. For example, the first switch lever protrusion 132 may be press fit within the brake lever 66. In an embodiment, the first switch lever protrusion 132 is adhesively mounted.

The first switch lever protrusion 132 may include a lever actuation feature 148. The lever actuation feature 148 may be sized and shaped to contact another component of the first switch assembly 130. For example, the lever actuation feature 148 may contact a control actuation feature 150 of the switch device 70. The control actuation feature 150 may be part of the first switch control protrusion 146. The lever actuation feature 148 may also be configured to control the bias device 144. For example, the lever actuation feature 148 may be sized and shaped concentrically within a coil spring configuration of the bias device 144 to resist buckling of the bias device 144.

The first switch lever protrusion 132 may also include a lever retention feature 152. The lever retention feature 152 may be employed to resist movement of the first switch lever protrusion 132 relative to the brake lever 66 during actuation. In an embodiment, the lever retention feature 152 abuts the brake lever 66 to resist movement. Alternatively, the lever retention feature 152 may be overmolded with the brake lever 66.

The first switch lever protrusion 132 may also include a lever cavity 154 configured to accept the bias device 144. For example, the lever cavity 154 may be annularly shaped and sized to accept a coil spring configuration of the bias device 144.

The first switch control protrusion 146 may include a control cavity 156 configured to accept the bias device 144. For example, the control cavity 156 may be annularly shaped and sized to accept a coil spring configuration of the bias device 144.

The embodiment of FIG. 8 shows the control actuation feature 150 as integral with the first switch control protrusion 146. In this configuration, the lever actuation feature 148 and the control actuation feature 150 may be configured to contact one another in a force transmitting manner. The force transmitting contact may be employed to actuate the first switch assembly 130. Alternatively, the bias device 144 may be configured to actuate the first switch assembly 130 while maintaining a gap between the lever actuation feature 148 and the control actuation feature 150. The bias device 144 is a tunable feature, for instance in spring rate, in order to actuate the first switch assembly 130.

The first switch assembly 130 includes a first switch 158. The first switch 158 may be metallic and/or electrically conductive. The first switch 158 may be operable to electrically connect components of the control unit 108. For example, the first switch 158 may be a metallic dome switch. In an embodiment, the first switch 158 has at least one electrical connection to the control unit 108 in a non-actuated state, adds at least a second electrical connection to the control unit 108 in a first actuated state, and adds yet at least a third electrical connection to the control unit 108 in a second actuated state. In this embodiment, all three electrical connections exist concurrently in the third actuated state, while only the at least one electrical connection and the second electrical connection exist concurrently in the second actuated state.

The embodiment of FIG. 8 provides a first switch first contact 159 and a first switch second contact 161 disposed on the first switch 158. In the non-actuated state depicted, neither the first switch first contact 159 nor the first switch second contact 161 are in electrical communication with (e.g. do not contact) the corresponding respective control unit contacts of the control unit 108. In an embodiment, the first switch 158 includes contacts that are disposed about a dome switch as legs and/or a body of the first switch 158. The legs of the dome switch may be of different lengths. For example, the first switch 158 may be a dome switch with a truncated leg. The truncated leg may provide the first switch second contact 161 on the end of the leg.

A seal member 160 may be provided. The seal member 160 is configured to seal the control compartment 73. For example, the seal member 160 may be sized and shaped to form a seal between the switch device 70 and the control cover 140. The seal member 160 may be deformable. In an embodiment, the seal member 160 is an elastomeric membrane sealing the switch device 70 to form the control compartment 73. The seal member 160 may be compressed by installation of the control cover, for instance with the control fasteners 142.

In the embodiment of FIG. 8, the seal member 160 includes a seal perimeter 162 configured to form a seal with at least one of the switch device 70 and the control cover 140. The seal perimeter 162 may be one or more ridges or protrusions on the periphery of the seal member 160. In an embodiment, the seal perimeter 162 is sized and shaped to seal with labyrinth and/or mortice configurations of the switch device 70 and/or the control cover 140.

The seal member 160 may include one or more features, such as protrusions, configured to facilitate actuation across the seal member 160. For example, a first seal protrusion 164 may be disposed between the first switch control protrusion 146 and the first switch 158. The first seal protrusion 164 may be configured to transmit force from the first switch control protrusion 146 over a discrete area within the control compartment 73, for example a dome configuration of the first switch 158. The seal member 160 may also include a second seal protrusion 166 disposed between the mode actuator 136 and a mode operator 168 of the mode assembly 134.

The mode operator 168 may be provided. The embodiment of FIG. 8 shows the mode operator 168 disposed on the control unit 108. The mode operator 168 may variously configured to change modes. For example, the mode operation 168 may be a switch, such as a momentary switch or a toggle switch. In an embodiment, actuation of the mode operator 168 opens or closes an electrical connection operative to modify operation of the first switch 158.

The control unit 108 may be sized and shaped to limit relative movement in the control compartment 73. In an embodiment, a control locating member 170 is provided to align the control unit 108 with the switch device 70. The control locating member 170 may be a protrusion of the switch device 70 sized and shaped to pass through the control unit 108. In an embodiment, a PCB configuration of the control unit 108 is aligned within the control compartment 73 using peripheral interaction between the control unit 108 and the control compartment 73 and through interaction of the control locating member 170 with the control unit 108.

One or more of a control support member 172 may also be provided. The control support member 172 may be a plurality of control support members 172 of one or more configurations. For example, the control support members 172 may include at least one protrusion configuration from the switch device 70 and a peripheral recess configuration. The control support members 172 are configured to support the control unit 108. The control support members 172 facilitate operation of at least one of the first switch 158 and the mode operator 168 by locating the control unit 108 relative to the switch device 70.

The embodiment of FIG. 8 provides a control connection 174 configured to facilitate electrical communication between the switch device 70 and other components. In an embodiment, the control connection 174 provides electrical communication between the control unit 108 and the control power source 118. Also in an embodiment, the control connection 174 provides electrical communication between the control unit 108 and at least one of the first and second accessory connections 124, 125. The control connection 174 may be removable, as in a plug connection, or may be sealed to prevent disconnection. In an embodiment the control connection is a cable including one or more conductors (e.g. four conductors) operable for communicating power and/or signals.

The switch device 70 includes at least one of an actuation surface 176 to facilitate operation of the first switch assembly 130. The actuation surface 176 may be substantially planar to receive a user's finger for operation. Alternatively, the actuation surface 176 may be a button, as in the configuration of the mode assembly 134 in FIG. 8.

FIG. 9 is a sectional view depicting an alternative embodiment of the switch device 70, the brake lever 66, and associated components. The embodiment of FIG. 9 differs from the embodiment of FIG. 8 in that a protrusion retention feature 178 is provided. The protrusion retention feature 178 is configured to retain the first switch control protrusion 146. For example, if the bias device 144 becomes damaged or dislodged, as in a crash, the protrusion retention feature 178 is sized and shaped to maintain the disposition of the first switch control protrusion 146 between the protrusion retention feature 178 and the first switch 158.

FIG. 10 is a sectional view of the switch device 70, the brake lever 66, and associated components of FIG. 8, in a first actuated state. The first actuated state of FIG. 10 differs from the non-actuated state of FIG. 8 in that the control actuation feature 150 is urged closer to the lever actuation feature 148, compressing the bias device 144. The first switch first contact 159 is urged into contact with the control unit 108, while the first switch second contact 161 remains spaced apart from the control unit 108, defining the first actuation position Y.

The first actuation position Y may be achieved through a user imparting force to the actuation surface 176, moving the first switch control protrusion 146 closer to the first switch lever protrusion 132. This relative movement may be facilitated through various configurations. For example, the switch device 70 may be hinged to the brake lever 66.

Alternatively, the switch device 70 may be slidably engaged with the brake lever 66. In an embodiment, the first switch 158 is operated directly.

The embodiment of FIG. 10 shows the bias device 144 urging apart the first switch control protrusion 146 from the first switch lever protrusion 132 with greater force than in the rest position X due to increased compression. The greater force imparted to the first switch control protrusion 146 is shown to deform the seal member 160. The seal member 160 is configured to transmit this force to the first switch 158, urging the first switch into the first actuation position Y, which may be defined by the first switch first contact 159 contacting the control unit 108 while the first switch second contact 161 remains spaced apart from the control unit 108. The seal member 160 is shown to transmit this force through the first seal protrusion 164, which may be a thickened elastomeric section of the seal member 160.

Figure 11:
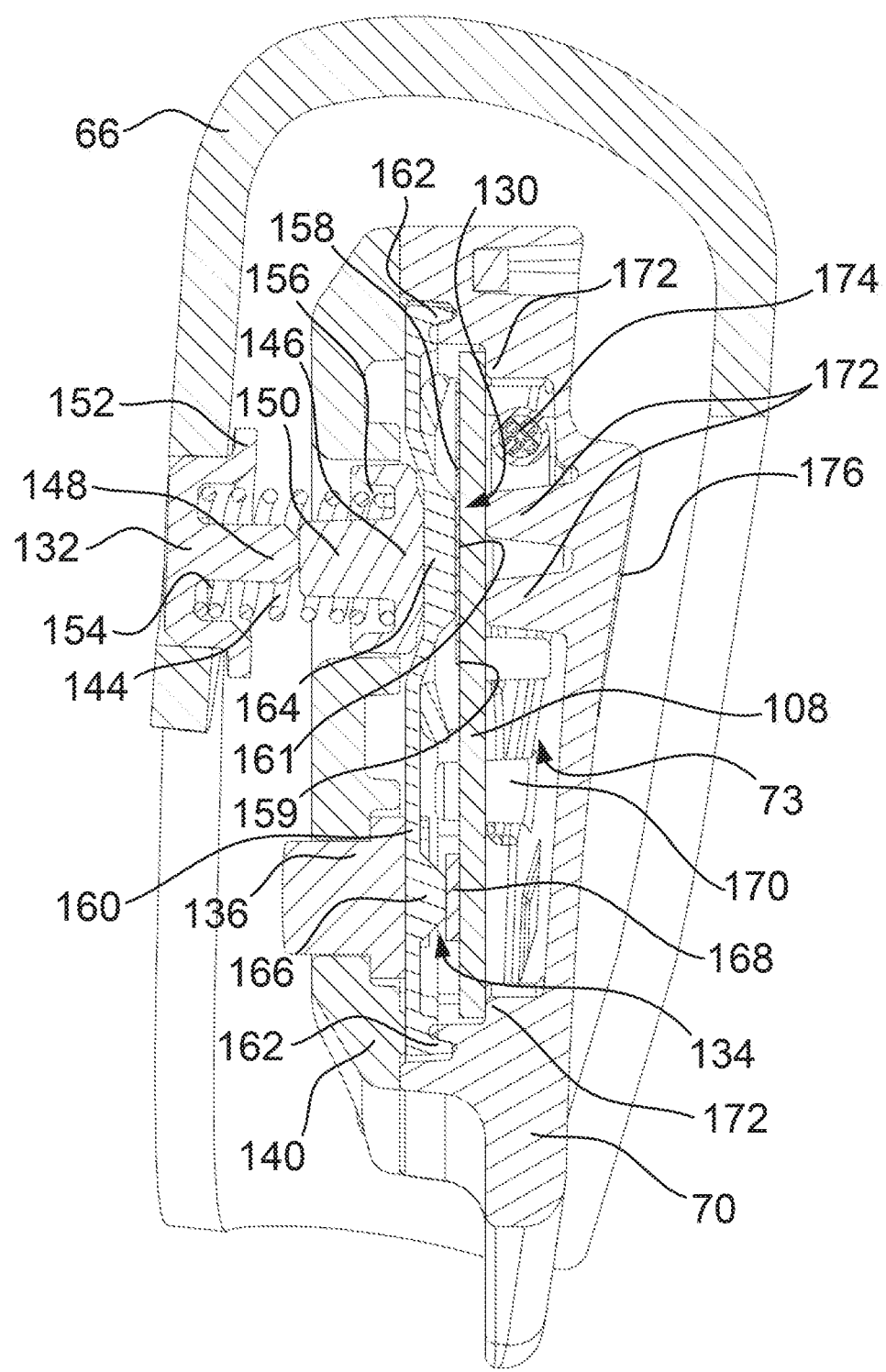
FIG. 11 is a sectional view of the component of the control assembly of FIG. 8 in a second actuated state.

FIG. 11 is a sectional view of the switch device 70, the brake lever 66, and associated components of FIG. 8, in a second actuated state. The second actuated state of FIG. 11 differs from the non-actuated state of FIG. 8 and the first actuated state of FIG. 10 in that the control actuation feature 150 is urged yet closer to the lever actuation feature 148, compressing the bias device 144 further. The first switch first contact 159 is urged into contact with the control unit 108. The first switch second contact 161 is urged into contact with the control unit 108, defining the second actuation position Z. The embodiment of FIG. 11 depicts the first switch first contact 159 in contact with the control unit 108. In another embodiment, the first switch first contact 159 is spaced apart from the control unit 108 while the first switch second contact 161 contacts the control unit 108 in the second actuation position Z.

The second actuation position Z may be achieved through a user imparting force to the actuation surface 176, moving the first switch control protrusion 146 yet closer to the first switch lever protrusion 132. The embodiment of FIG. 11 shows the bias device 144 urging apart the first switch control protrusion 146 from the first switch lever protrusion 132 with greater force than in the first actuation position Y due to increased compression. The lever actuation feature 148 may also impart a force on the control actuation feature 150, further urging the first switch control protrusion 146 into the seal member 160.

The first switch lever protrusion 132 and the first switch control protrusion 146 may be sized and shaped to facilitate operation of the first switch from the rest position X, to the first actuation position Y, and further to the second actuation position Z in the absence of the bias device 144. In an embodiment, the bias device 144 may be omitted. For example, the embodiment of FIG. 9, including the protrusion retention feature 178 may omit the bias device while retaining similar functionality with regard to contact of the first switch 158 and the control unit 108.

The greater force imparted to the first switch control protrusion 146 is shown to deform the seal member 160 further than in the first actuation position Y, and into the second actuation position Z as depicted in FIG. 11. The seal member 160 is configured to transmit this force to the first switch 158, urging the first switch into the second actuation position Z, which may be defined by the first switch second contact 161 contacting the control unit 108. The first switch first contact 159 may remain in contact with the control unit, as depicted, or may be spaced apart from the control unit 108 in the second actuation position Z. The seal member 160 is shown to transmit this force through the first seal protrusion 164, which may be a thickened elastomeric section of the seal member 160.

Each of the positions X, Y, and Z of the switch device 70 may correspond to various displacements of the switch device 70 relative to other components. For example, the rest position X, the first actuation position Y, and the second actuation position Z may each represent a range of axial and/or angular displacements of the switch device 70 relative to the brake lever 66. In an embodiment, the switch device 70 transitions from the first actuation position Y to the second actuation position Z at a relatively large displacement from the rest position X and transitions from the second actuation position Z to the first actuation position Y at a relatively small displacement from the rest position X. For example, the switch device may transition to the first actuation position Y in less than 1 millimeter of travel. In an embodiment, the first actuation position Y occurs between 0.2 and 1 millimeters of travel. A dome configuration of the first switch 158 may require relatively a high force to invert and may require relatively little force to maintain inversion and the second actuation position Z.

Figure 12A:
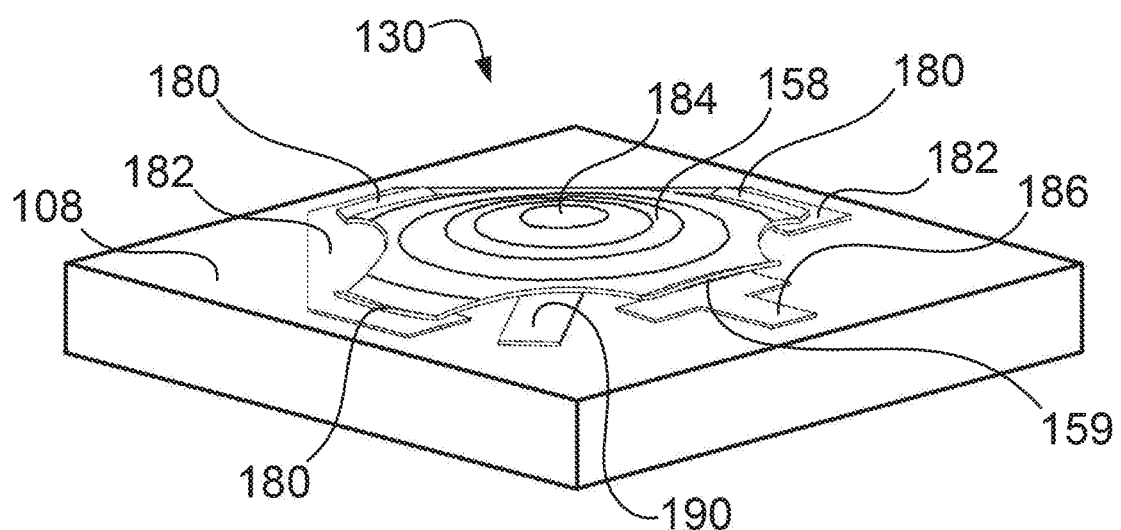
FIG. 12A is an isometric view of a switch mounted to a board of the control assembly.
Figure 12B:
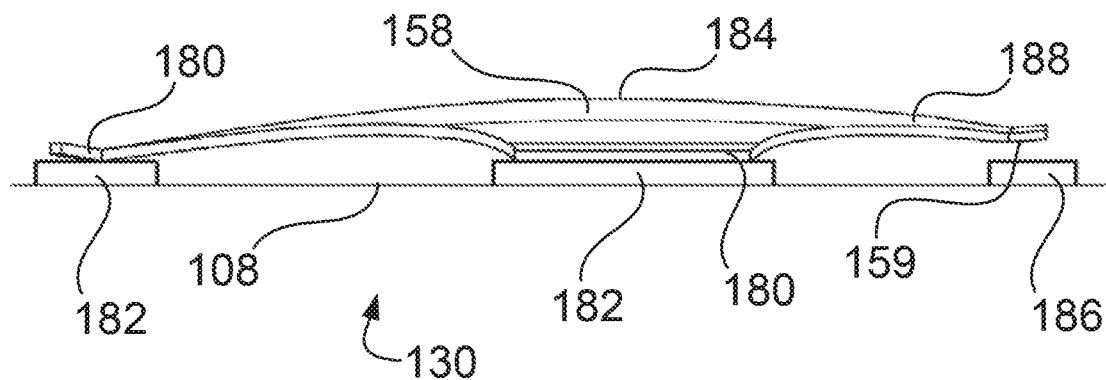
FIG. 12B is a side view of the switch of FIG. 12A.

FIGS. 12A and 12B depict a representation of an embodiment of the first switch assembly 130 in the rest position X, showing the first switch 158 mounted to the control unit 108. Portions of the first switch 158 may be mounted to electrically conductive components of the control unit 108. For example, the first switch 158 may have one or more of a mounted contact 180 configured to contact the control unit 108 in the rest position X. In an embodiment, the first switch 158 comprises three (3) mounted contacts 180.

At least one of the mounted contacts 180 is configured to be in electrical communication with the control unit 108. The control unit 108 comprises at least one of a mounting contact 182. In an embodiment, the control unit 108 comprises three (3) mounting contacts 182, corresponding to three (3) mounted contacts 180. Also in an embodiment, as depicted in FIG. 12A, the control unit comprises two (2) mounting contacts 182. As illustrated more than one of the mounted contacts 180 may electrically communicate with a single one of the mounting contacts 182. Conversely, more than one of the mounting contacts 182 may electrically communicate with a single one of the mounted contacts 180.

A first switch interaction surface 184 may be provided to facilitate actuation of the first switch 158 through one or more other components. FIGS. 12A and 12B depict an embodiment of the first switch interaction surface 184 sized and shaped to interact with various other components. For example, the shown embodiment may interact with a button (not shown) similar in configuration to the mode actuator 136 depicted in FIG. 8. Alternatively, the first switch interaction surface 184 may interact with the first seal protrusion 164 as shown in and described with reference to FIG. 8. The first switch interaction surface 184 may alternatively be configured for direct user operation. For instance, a user may operate the first switch 158 by applying his or her finger to the first switch interaction surface 184.

FIG. 12B illustrates the spaced apart relationship between the first switch first contact 159 and the control unit 108 in the rest position X. Specifically, there is a gap between the first switch first contact 159 and a unit first contact 186. A spaced apart arrangement of the first switch first contact 159 and the unit first contact 186 may be configured to resist electrical communication. Depending on factors such as conductivity, current, and voltage, the first switch first contact 159 and the unit first contact 186 may be configured to minimize conductivity therebetween, through physical contact, arcing, or other transmission.

In an embodiment, the first switch first contact 159 is disposed on a movable member 188 of the first switch 158. The movable member 188 may be an elastic and/or deformable component. For example, the movable member 188 may be a leg of a dome configuration of the first switch 158. Alternatively or additionally, the movable member 188 may be hinged, rotatable, and/or slidable relative to other contacts of the first switch 158.

FIG. 12A depicts an extended configuration of a unit second contact 190 disposed on the control unit 108 and configured for interaction with the first switch second contact 161. In the depicted rest position X, the unit second contact 190 does not electrically communicate through the first switch second contact 161. The first switch 158 is configured such that the first switch second contact 161 and the unit second contact 190 are brought into electrically communicative contact only in the second actuation position Z.

An embodiment of the control unit 108 may be configured to accept various configurations of the first switch 158. For example, the unit first contact 186 may be sized and shaped to accommodate varying configurations of the first switch first contact 159, according to varying lengths of the movable member 188. The configuration of FIG. 12A may also accommodate a configuration of the first switch 158 omitting the unit first contact 186. For example, the first switch 158 may be provided with four (4) mounted contacts 180 corresponding to four (4) mounting contacts 182. In an embodiment omitting the unit first contact 186, the described interaction between the first switch first contact 159 and the unit first contact 186 may be functionally replaced with an additional mechanical switch (not shown).

Figure 13A:
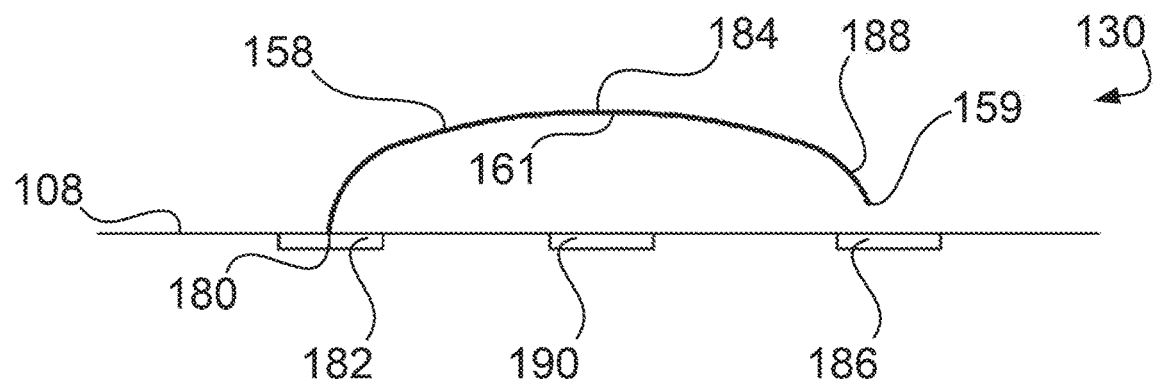
FIG. 13A is a schematic view of the switch of FIG. 12B in a non-actuated state.

FIG. 13A is a schematic view of the first switch assembly 130 of FIG. 12A in the rest position X. The rest position X may correspond to an open configuration where no electrical communication across the first switch 158 occurs. Alternatively, electrical communication across the first switch 158 may be facilitated in the rest position X. For example, electrical communication may occur between two of the mounting contacts 182, across corresponding embodiments of the mounted contacts 180 through the first switch 158.

In the rest position X, electricity does not flow from the mounting contact 182 to the unit first contact 186 and does not flow from the mounting contact 182 to the unit second contact 190. The schematic of FIG. 13A represents this position by showing the first switch first contact 159 spaced apart from the unit first contact 186 and the first switch second contact 161 spaced apart from the unit second contact.

The electrical connections in the rest position X may result in operation of various components in various states. For example, the control communication device 71 may be operated in the rest position X. In an embodiment, the control processor 110 is configured to respond to the flow of electricity in the rest position X. For example, the control processor 110 may be configured to send signals to the control communication device 71. In the rest position X, the control processor 110 may be configured to send signals to the control communication device 71 to operate the control communication device 71 in a rest mode. The rest mode of the control communication device 71 may be a low power mode. For instance, the control communication device 71 may be configured to send no wireless transmissions or relatively few wireless transmissions in the rest mode.

Figure 13B:
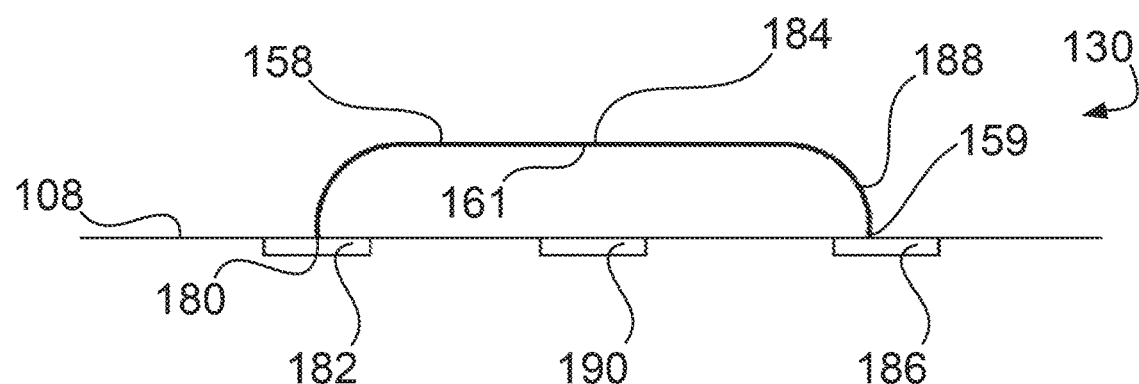
FIG. 13B is a schematic view of the switch of FIG. 12B in a first actuated state.

FIG. 13B is a schematic view of the first switch assembly 130 of FIG. 12A in the first actuation position Y. The first actuation position Y may correspond to a partially closed configuration. The first actuation position Y is shown to facilitate electrical communication from the mounting contact 182, to the mounted contact 180, across the first switch 158 to the first switch first contact 159, and to the unit first contact 186. In an embodiment, there is no electrical communication across the first switch 158 from the unit second contact 190 in the first actuation position Y.

Various contacts of the first switch assembly 130 may be variously arranged. For example, the unit first contact 186 and the unit second contact 190 may be raised relative to the control unit 108 and/or the mounting contact 182. In an embodiment, the unit first contact 186, the unit second contact 190, and the mounting contact 182 lie in a plane. The first switch 158 may be configured such that the mounted contact 180 and the first switch first contact 159 lie in the same plane in the first actuation position Y.

The electrical connections in the first actuation position Y may result in operation of various components in various states. For example, the control communication device 71 may be operated in the first actuation position Y. In an embodiment, the control processor 110 is configured to respond to the flow of electricity in the first actuation position Y. For example, the control processor 110 may be configured to send signals to the control communication device 71. In the first actuation position Y, the control processor 110 may be configured to send signals to the control communication device 71 to operate the control communication device 71 in a first actuation mode. The first actuation mode of the control communication device 71 may be an active mode. For instance, the control communication device 71 may be configured to send wireless transmissions in the first actuation mode.

Wireless transmissions in the first actuation mode may be received by various other components. For example, the control communication device 71 may send transmissions through the control antenna 114 for reception by at least one of the front communication device of the front gear changer 50 and the rear communication device of the rear gear changer 48. Signals sent in the first actuation mode may be anticipation signals configured to trigger listening without triggering a shifting motion. For example, the rear processor and/or the front processor may be configured to listen for an extended time, with the respective one of the rear communication device and/or the front communication device responsive to reception of anticipation signals with the rear communication device and/or the front communication device.

Figure 13C:
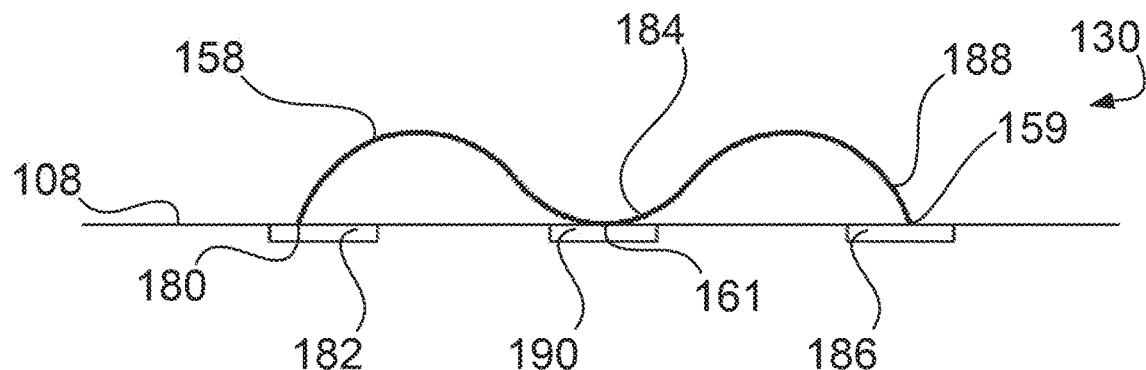
FIG. 13C is a schematic view of the switch of FIG. 12B in a second actuated state.

FIG. 13C is a schematic view of the first switch assembly 130 of FIG. 12A in the second actuation position Z. The second actuation position Z may correspond to a fully closed configuration. The second actuation position Z is shown to facilitate electrical communication from the mounting contact 182, to the mounted contact 180, across the first switch 158, to the first switch first contact 159, to the unit first contact 186, to the first switch first contact, and to the unit second contact 190. Alternatively, the second actuation position Z may correspond to a partially closed configuration. For example, the second actuation position Z may facilitate electrical communication from the mounting contact 182, to the mounted contact 180, across the first switch 158 to the first switch second contact 161, and to the unit second contact 190. In an embodiment, there is no electrical communication across the first switch 158 from the unit first contact 186 in the second actuation position Z.

In an embodiment, the unit first contact 186, the unit second contact 190, and the mounting contact 182 lie in a plane. The first switch 158 may be configured such that the mounted contact 180, the first switch first contact 159, and the first switch second contact 161 lie in the same plane in the second actuation position Z. The first switch 158 may be configured to lie entirely in this plane, or portions of the first switch 158 interspersed between the first switch contacts 159, 161, 180 may lie above or below this plane.

The electrical connections in the second actuation position Z may result in operation of various components in various states. For example, the control communication device 71 may be operated in the second actuation position Z. In an embodiment, the control processor 110 is configured to respond to the flow of electricity in the second actuation position Z. For example, the control processor 110 may be configured to send signals with the control communication device 71. In the second actuation position Z, the control processor 110 may be configured to send signals to the control communication device 71 to operate the control communication device 71 in a second actuation mode. The second actuation mode of the control communication device 71 may be an active mode. For instance, the control communication device 71 may be configured to send wireless transmissions in the second actuation mode.

Wireless transmissions in the second actuation mode may be received by various other components. For example, the control communication device 71 may send transmissions through the control antenna 114 for reception by at least one of the front communication device of the front gear changer 50 and the rear communication device of the rear gear changer 48. Signals sent in the second actuation mode may be operation signals configured to trigger a shifting motion. For example, the rear processor and/or the front processor may be configured to perform a shifting motion, with the respective one of the rear motor and/or the front motor responsive to reception of operation signals with the respective one of the rear communication device and/or the front communication device.

Figure 14:
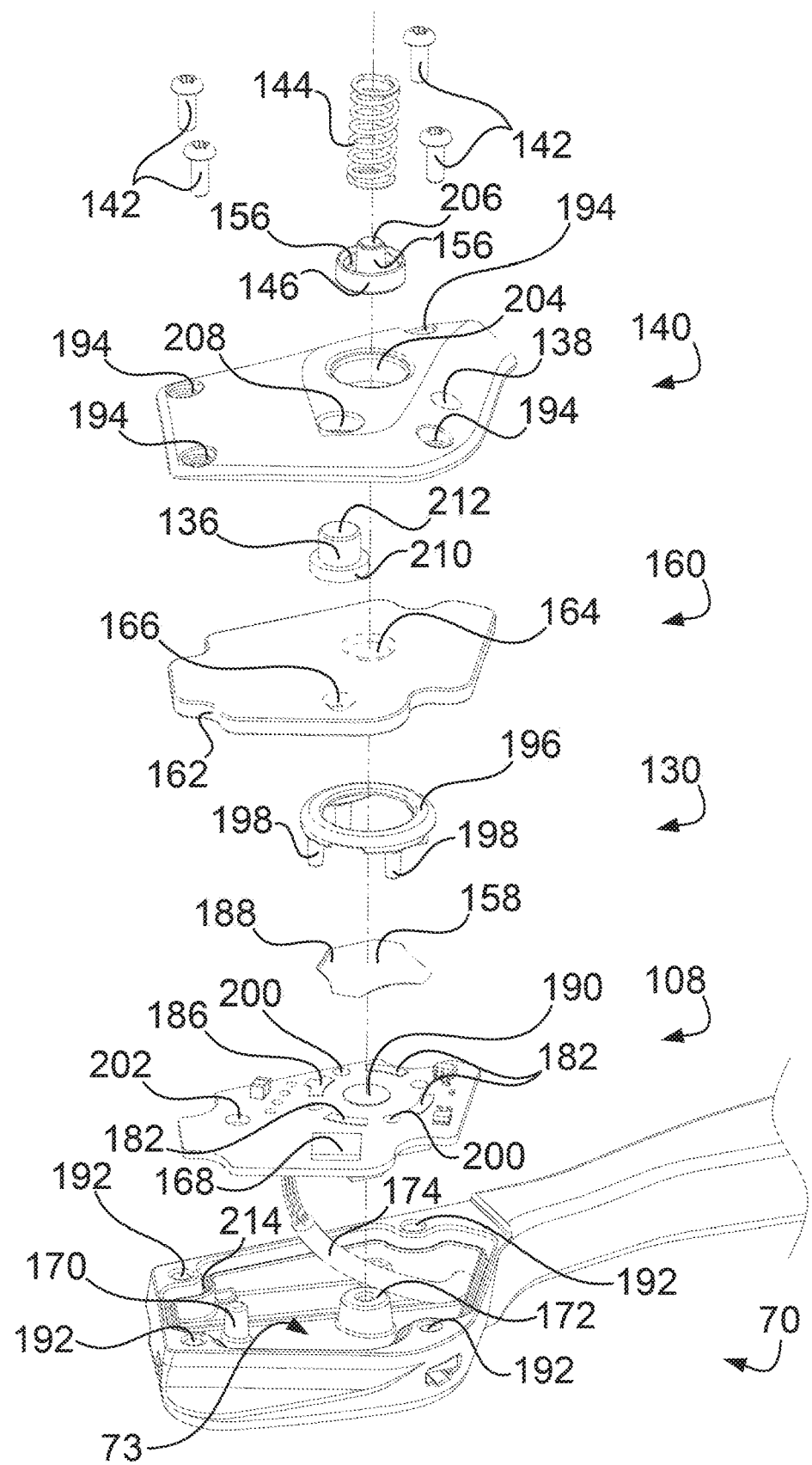
FIG. 14 is an exploded view of the component of the control assembly of FIG. 6.

FIG. 14 is an exploded view of the switch device 70 and associated components of FIG. 6. Each of the control fasteners 142 is shown removed from a control fastener mount 192 in the switch device 70. The control fastener mounts 192 may be threaded holes for receiving threaded screw embodiments of the control fasteners 142.

Each of the control fasteners 142 may be configured to secure the control cover 140 to the switch device 70 through a cover fastener mount 194. The cover fastener mounts 194 may be through holes configured to guide passage of the control fasteners 142 therethrough. The cover fastener mounts 194 may be configured to engage the control fasteners 142 such that the threaded engagement of the control fasteners 142 with the control fastener mounts 192 and the engagement of the control fasteners 142 with the cover fastener mounts 194 urge the switch device 70 together with the control cover 140. In an alternative embodiment, the cover fastener mounts 194 may be threaded holes and the control fastener mounts 192 may be through holes.

The first switch 158 may be located in various ways. For example, a retaining member 196 may be provided. The retaining member 196 may be mountable to the control unit 108 with one or more of a retaining leg 198. A plurality of the retaining legs 198 may be mountable with a plurality of retaining features 200 of the control unit 108. For example, one of the retaining legs 198 may be sized and shaped to fit within a recess configuration of one of the retaining features 200. In an embodiment, the retaining member 196 is secured in place by installation of the control over 140. Alternatively, the retaining member 196 may be bonded to the control unit 108. For example, the retaining legs 198 may be soldered, welded, or adhesively mounted to the retaining features 200.

The retaining features 200 may also be omitted. In an embodiment, the first switch 158 is adhesively mounted to the control unit 108. For example, the first switch 158 may be disposed between the control unit 108 and a film or tape (not shown) fitted over the first switch 158 and secured to the control unit 108. In another embodiment, one or more of the mounted contacts 180 may be bonded to one or more of the mounting contacts 182.

A locating feature 202 may be provided on the control unit 108 to locate the control unit 108 relative to the switch device 70. For example, the locating feature 202 may be configured to engage with the control locating member 170. In an embodiment, the locating feature 202 is a hole in a circuit board configuration of the control unit 108 configured to accept a post configuration of the control locating member 170.

The first switch control protrusion 146 may be housed in a first switch receiving feature 204. The first switch receiving feature 204 is configured to facilitate operation of the first switch 158 with the first switch control protrusion 146. For example, the first switch receiving feature 204 may be a hole in the control cover 140 through which the first switch control protrusion 146 contacts the first switch 158. In an embodiment, the first switch control protrusion 146 is retained in the first switch receiving feature 204. For example, the protrusion retention feature 178 may be provided, as in FIG. 9, to retain the first switch control protrusion 146 between the control cover 140 and the first switch 158.

Referring again to FIG. 14, the first switch control protrusion 146 may be provided with a first switch control actuation surface 206. The first switch control actuation surface 206 may facilitate operation of the first switch 158. For example, a user may apply pressure directly to the first switch control actuation surface 206. In an embodiment, the first switch control actuation surface 206 is configured to interact with the lever actuation feature 148. For example, the first switch control actuation surface 206 may be sized and shaped to displace the first switch control protrusion 146 towards the first switch 158 when the lever actuation feature 148 contacts the first switch control actuation surface 206 as shown in FIG. 11.

Referring again to FIG. 14, the mode actuator 136 may be housed in a mode receiving feature 208. The mode receiving feature 208 is configured to facilitate operation of the mode operator 168 with the mode actuator 136. For example, the mode receiving feature 208 may be a hole in the control cover 140 through which the mode actuator 136 contacts the mode operator 168. In an embodiment, the mode actuator 136 is retained by a mode retaining feature 210. For example, the mode retaining feature 210 may be a relatively large diameter portion of the mode actuator 136. The mode retaining feature 210 may be shaped and sized to not pass through the mode receiving feature 208.

The mode actuator 136 may be provided with mode actuation surface 212. The mode actuation surface 212 may facilitate operation of the mode operator 168. For example, a user may apply pressure directly to the mode actuation surface 212.

The seal member 160 is shown disposed between the first switch 158 and the first switch control protrusion 146 and between the mode operator 168 and the mode actuator 136. The seal member 160 may be an elastomeric membrane configured to seal the switch device 70. For example, the seal member 160 may form a seal between the seal perimeter 162 and a seal feature 214 of the switch device 70. The seal feature 214 may be a groove, ridge, and/or labyrinth configuration about a perimeter of the control compartment 73.

The seal member 160 may be omitted or otherwise configured. For example, an injectable epoxy filling may be used to seal the control compartment 73. The seal member 160 may also be integrated with one or more other components. For example, the seal member 160 may be an elastomeric sealing portion of the control cover 140. In an embodiment, the seal member 160 is omitted and other components are protected from environmental conditions independently, such as with conformal coating.

Figure 15A:
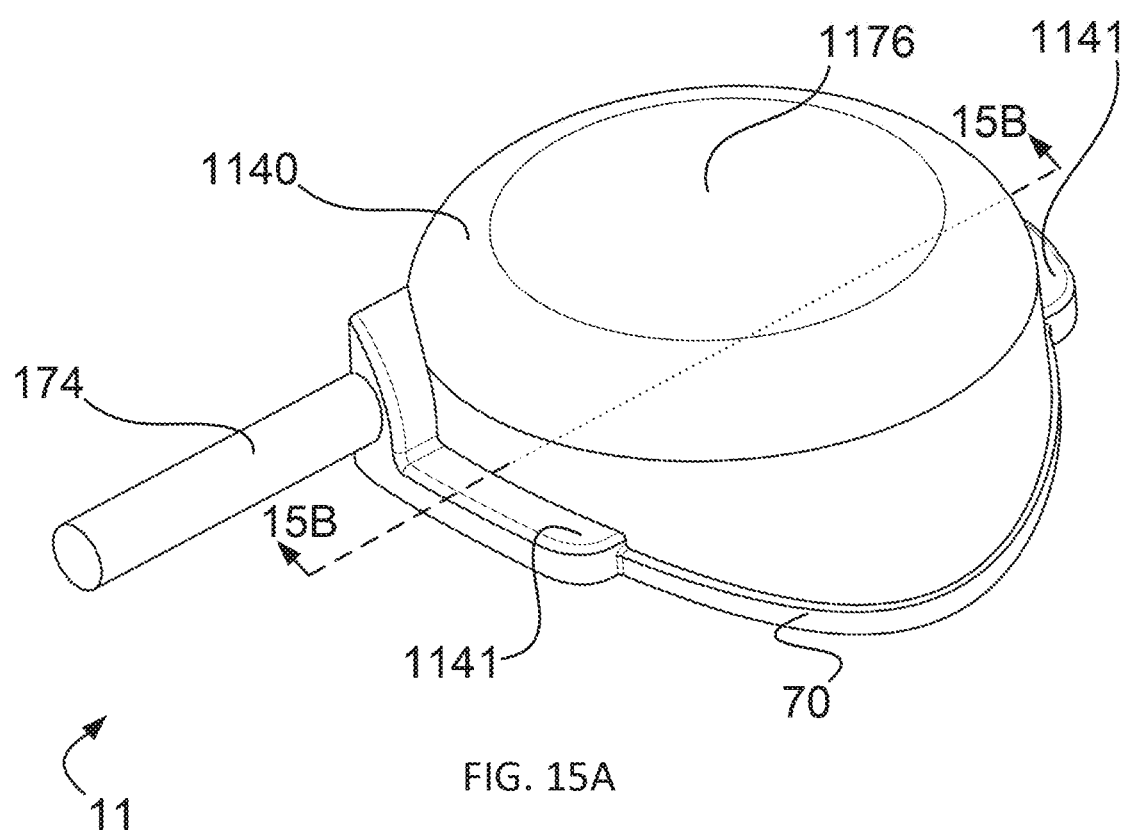
FIG. 15A is an isometric view of an embodiment of a control assembly.

FIG. 15A depicts another embodiment of the control assembly 11. The embodiment of FIG. 15A differs from previous embodiments in that the control assembly 11 is configured for mounting on a straight portion of an embodiment of the handlebar 58 having an annular cross-section. The embodiment of the switch device 70 depicted may be mounted in various orientations. For example, the switch device 70 shown may be mounted to the stem 54, the frame 12, one or more of a handlebar extension 2063, or other components of the bicycle 10.

The switch device 70 shown may be used in place of or in addition to other embodiments. For example, the switch device 70 may communicate wirelessly or through the control connection 174 with the embodiment of the switch device 70 shown in FIG. 6. Multiple embodiments of the switch device 70 implemented may be configured as redundant or supplemental devices. For example, operation of an embodiment of the switch device 70 shown in FIG. 15 connected to an embodiment of the switch device 70 shown in FIG. 6 may result in the same signals and same functionality as operation of that embodiment of the switch device 70 to which it is connected. Operation of opposing embodiments of the switch device 70 (e.g. left and right mountings) may be configured to supplement the signals and functionality of each other. For example, a left mounted embodiment of the switch device 70 may be configured to send a downshift signal and a right mounted embodiment of the switch device 70 may be configured to send an upshift signal.

The switch device 70 may be mounted to the handlebar 58 or other components with one or more of a securing portion 1141. The securing portion 1141 may be a plurality of securing protrusions. In an embodiment, adhesive components (not shown), cable ties (not shown), or the like may be employed to secure the switch device 70 and/or the securing portion 1141. Installation of handlebar tape (not shown) over the switch device 70 and the handlebar 58 may additionally or alternatively secure the switch device 70 to the handlebar 58.

The control assembly 11 of FIG. 15A includes an elastomeric embodiment of a control cover 1140. The control cover 1140 may be configured to seal the control compartment 73 from external conditions. For example, the control cover 1140 may be sized and shaped to deformably mount over the switch device 70 in a sealing manner. In an embodiment, the control cover 1140 is adhesively mounted to the switch device 70.

Figure 15B:
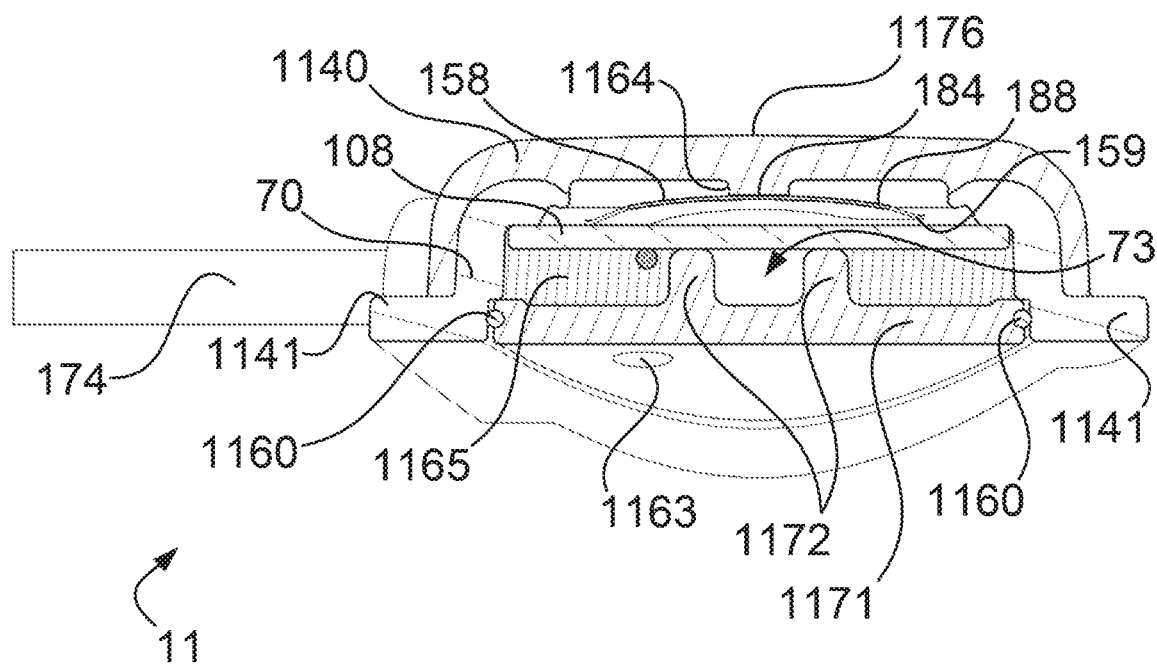
FIG. 15B is a sectional view of the control assembly of FIG. 15A.

As in FIG. 15B, the control compartment 73 may also include an embodiment of a seal member 1160. The seal member 1160 may be provided to form a seal between the switch device 70 and a support structure 1171. The support structure 1171 may be provided as a removable component from the switch device 70. In an embodiment, the support structure 1171 may be installed to overmolded embodiments of the switch device 70 and the control cover 1140 after installation of internal components, including the control unit 108.

The embodiment of the control cover 1140 in FIGS. 15A and 15B includes an embodiment of an actuation surface 1176. The actuation surface 1176 shown is deformable for operation of the first switch 158. A user may operate the actuation surface 1176 to move the first switch 158 from the rest position X, to the first actuation position Y, and to the second actuation position Z.

FIG. 15B is a sectional view of the control assembly 11 of FIG. 15A. The first switch 158 includes the movable member 188, movable for opening and closing of the first switch first contact 159 with the control unit 108. The embodiment shown may also include contacts disposed on the control unit 108 as in other embodiments. For example, the control unit 108 may include the unit first contact 186, the unit second contact 190, and/or a plurality of mounting contacts 182.

An actuation protrusion 1164 may be provided to facilitate operation of the first switch 158. For example, the control cover 1140 may include the actuation protrusion 1164 to impart pressure applied to the actuation surface 1176 to the first switch 158. The actuation protrusion 1164 may be configured to direct pressure to a central portion of the first switch 158. For example, the actuation protrusion 1164 may be sized and shaped to concentrate an actuation force on the first switch interaction surface 184.

The support structure 1171 may be provided with one or more of a control support member 1172 for supporting the control unit 108. In an embodiment, two of the control support members 1172 are employed for stabilization of the control unit 108. The control support members 1172 may also be omitted or provided on the control unit 108.

Other components may be provided between the support structure 1171 and the control unit 108. For example, a seal compound 1165 may be provided. The seal compound 1165 may be an elastomeric component installed before the control compartment 73 is closed. Alternatively, the seal compound 1165 may be injected into the control compartment 73 after installation of the support structure 1171. The seal compound 1165 may be an adhesive material and/or an epoxy.

One or more of a vacancy 1163 may be provided for installation of the seal compound 1165. For example, a first embodiment of the vacancy 1163 may be provided for injecting the seal compound 1165 and a second embodiment of the vacancy 1163 may be provided to allow evacuation of gas during injection and to facilitate effective injection. The vacancy 1163 may be filled after installation of the seal compound 1165.

Figure 16A:
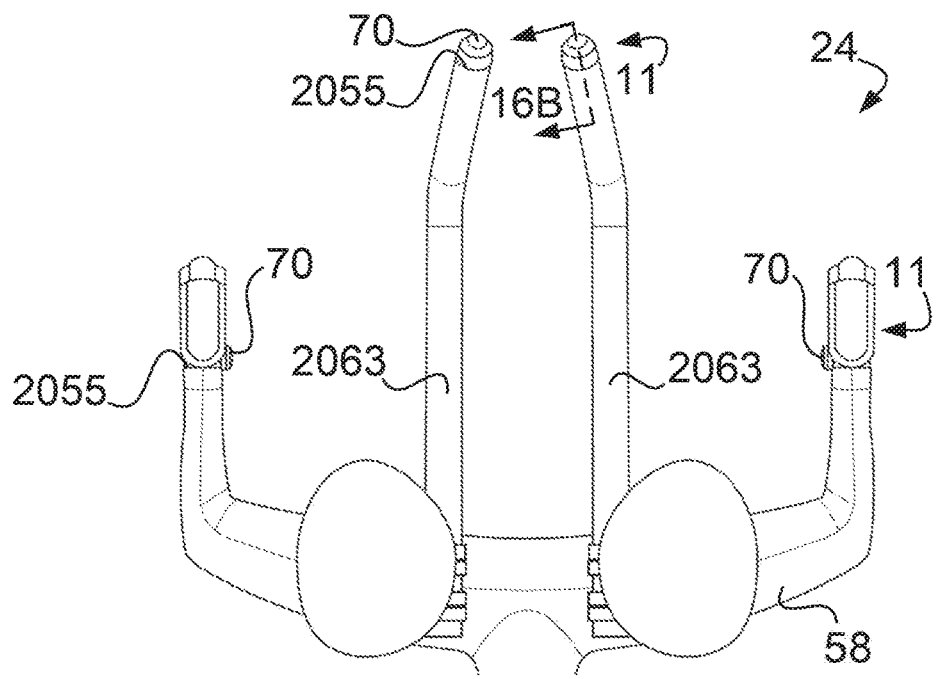
FIG. 16A is an isometric view of an embodiment of a control assembly.

FIG. 16A depicts an alternative embodiment of the handlebar assembly 24, including an embodiment of the control assembly 11. The control assembly 11 may be at least partially disposed within an embodiment of the handlebar assembly 24. In an embodiment, the control assembly 11 extends partially into an open end 2055 of the handlebar assembly 24.

The handlebar assembly 24 depicted in FIG. 16A includes two of the handlebar extension 2063. The handlebar extension 2063 may be formed integrally with the handlebar 58 or may be a removable, adjustable, and/or separate component. For example, the handlebar extension 2063 may be clamped to the handlebar 58. At least one of the open ends 2055 may be provided on the handlebar extension 2063 for receiving the control assembly 11. One or more of the open ends 2055 may be provided on other parts of the handlebar assembly 24 for receiving the control assembly 11, for instance as indicated in FIG. 3A.

Figure 16B:
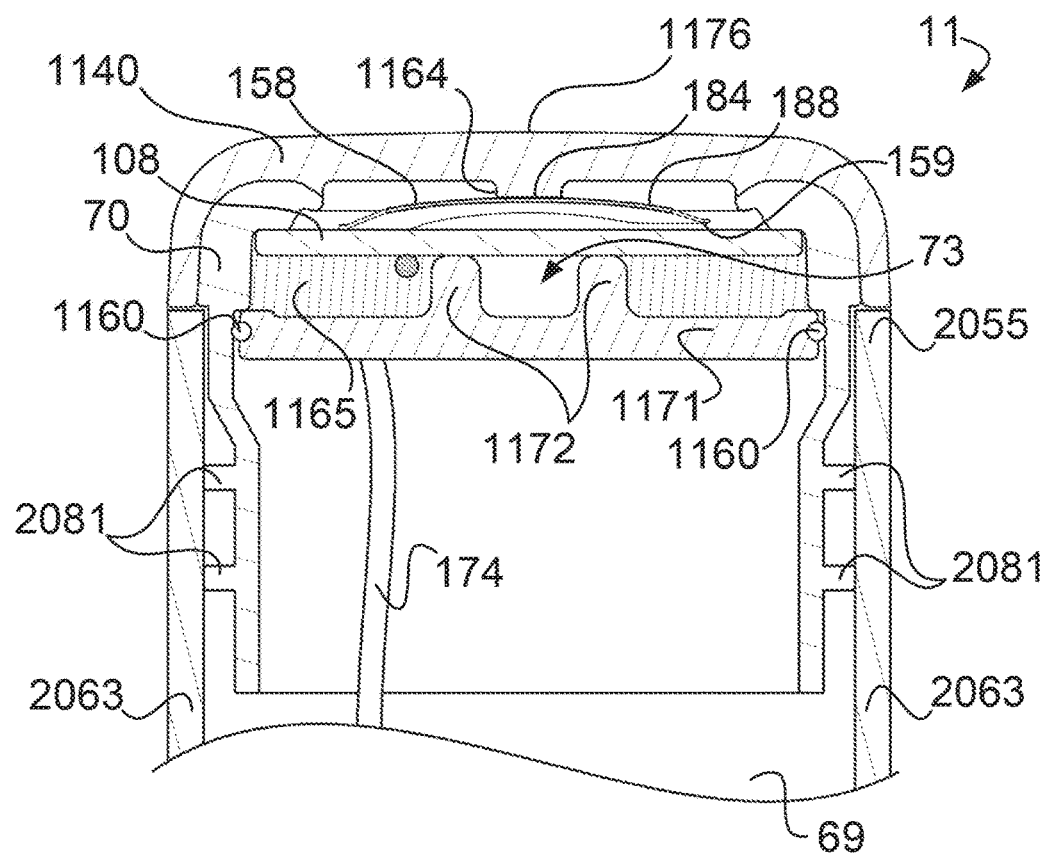
FIG. 16B is a sectional view of the control assembly of FIG. 16A.

FIG. 16B is a sectional view of the control assembly 11 of FIG. 16A. A portion of the switch device 70 is shown disposed within the open end 2055 of the handlebar extension 2063. Another portion of the switch device 70 is disposed external to the handlebar extension 2063 and is covered with the control cover 1140. The control cover 1140, the switch device 70, and/or another component may abut the open end 2055 of the handlebar extension 2063 to limit insertion therein.

The switch device 70 may include one or more of a securing protrusion 2081. In an embodiment, the securing protrusion 2081 comprises a plurality of securing protrusions. The securing protrusions 2081 may be integrated with or affixed to the switch device 70. In an embodiment, the securing protrusions 2081 are provided on an elastomeric sleeve (not shown) configured to fit between the switch device 70 and the handlebar extension 2063. The securing protrusions 2081 may be overmolded with the switch device 70.

The control unit 108 may communicate in various ways with other components. For example, FIG. 16B depicts an embodiment having the control connection 174. The control connection 174 is shown internal to the switch device 70 and passing through a handlebar interior 69 of the handlebar assembly 24. In such a way, the control connection 174 may electrically communicate through the handlebar extension 2063 or the handlebar 58. The control connection 174 may also be disposed external to the handlebar assembly 24. For example, the control connection 174 may pass along outside the handlebar extension 2063, and may also be secured using handlebar wrap or tape (not shown).

The control unit 108 depicted in FIG. 16B may connect to another component, for instance the embodiment of the control unit provided in FIG. 6. This connection may be a wired connection, as through the control connection 174, or may be wireless. The control unit 108 may also be configured to wirelessly communicate with other components, such as the rear gear changer 48 and/or the front gear changer 50.

Figure 17:
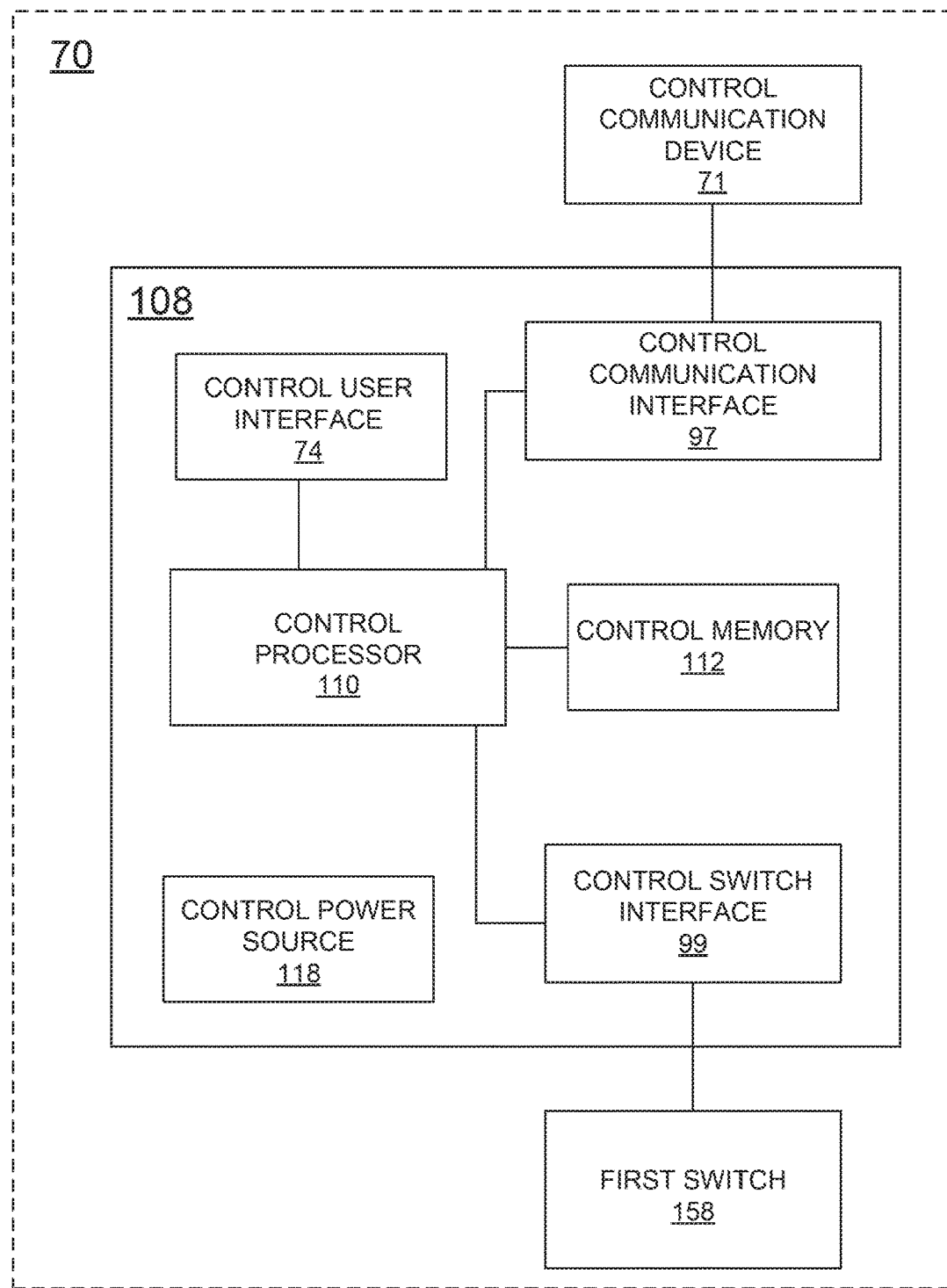
FIG. 17 is a block diagram of an embodiment of a control assembly.

FIG. 17 is a block diagram of an embodiment of the control assembly 11. The control assembly 11 may be used alone to communicate with and control bicycle components, or the control assembly 11 may be used in conjunction with at least one other control system for components of the bicycle, such as a primary embodiment of the control assembly 11 like that of FIG. 6 that may include alternative control assemblies such as those of FIGS. 15A and 16A.

The control assembly 11 is provided with the control unit 108, which includes the control processor 110, the control memory 112, the control user interface 74, the control power source 118, a control communication interface 97, and a control switch interface 99. In an embodiment, the control communication interface 97 is in communication with the control communication device 71 and the control switch interface 99 is in communication with the first switch 158. Additional, different, or fewer components may be provided. For example, the control user interface 74 may be omitted.

The control processor 110 may include a general processor, digital signal processor, an ASIC, FPGA, analog circuit, digital circuit, combinations thereof, or other now known or later developed processor. The control processor 110 may be a single device or combinations of devices, such as through shared or parallel processing.

The control power source 118 is a portable power source, which may be stored internal to the control assembly 11 or stored external to the control assembly 11 and communicated to the control assembly 11 through a power conductive cable. The control power source 118 may involve the generation of electric power, for example using a mechanical power generator, a fuel cell device, photo-voltaic cells, piezoelectric, or other power-generating devices. The control power source 118 may include a battery such as a device consisting of two or more electrochemical cells that convert stored chemical energy into electrical energy. The control power source 118 may include a combination of multiple batteries or other power providing devices. Specially fitted or configured battery types, or standard battery types such as CR 2012, CR 2016, and/or CR 2032 may be used.

The control switch interface 99 provides for data communication from one or more switches of the control assembly 11 to the control unit 108. For example, the control switch interface 99 may facilitate communication from at least one of the first switch 158 and the mode operator 168 to the control processor 110. The control switch interface 99 includes wired conductive signal and/or data communication circuitry operable to interpret signals provided by different embodiments of the switch device 70. For example, the control switch interface 99 may include a series of ports for receiving control assembly input cables. Each of the ports may be distinguishable by the control processor 110 through grouping tables or arrays, or through physical circuits or other circuitry that provide for grouping control assembly inputs.

The control user interface 74 may be one or more buttons, keypad, keyboard, mouse, stylus pen, trackball, rocker switch, touch pad, light sensor, voice recognition circuit, or other device or component for communicating data between a user and the control assembly 11. The control user interface 74 may be a touch screen, which may be capacitive or resistive. The control user interface 74 may include a liquid crystal display ("LCD") panel, LED, LED screen, thin film transistor ("TFT") screen, or another type of display. The control user interface 74 may also include audio capabilities, or speakers.

The control communication interface 97 is configured to send, with the control communication device 71, data such as anticipation signals, operation signals, and/or other signals for reception with bicycle components. The control communication interface 97 may also be configured to receive data such as status signals from the rear gear changer 48 and/or the front gear changer 50. The control communication interface 97 communicates the data using any operable connection. An operable connection may be one in which signals, physical communications, and/or logical communications may be sent and/or received. An operable connection may include a physical interface, an electrical interface, and/or a data interface. The control communication interface 97 provides for wireless communications through the control communication device 71 in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

Figure 18:
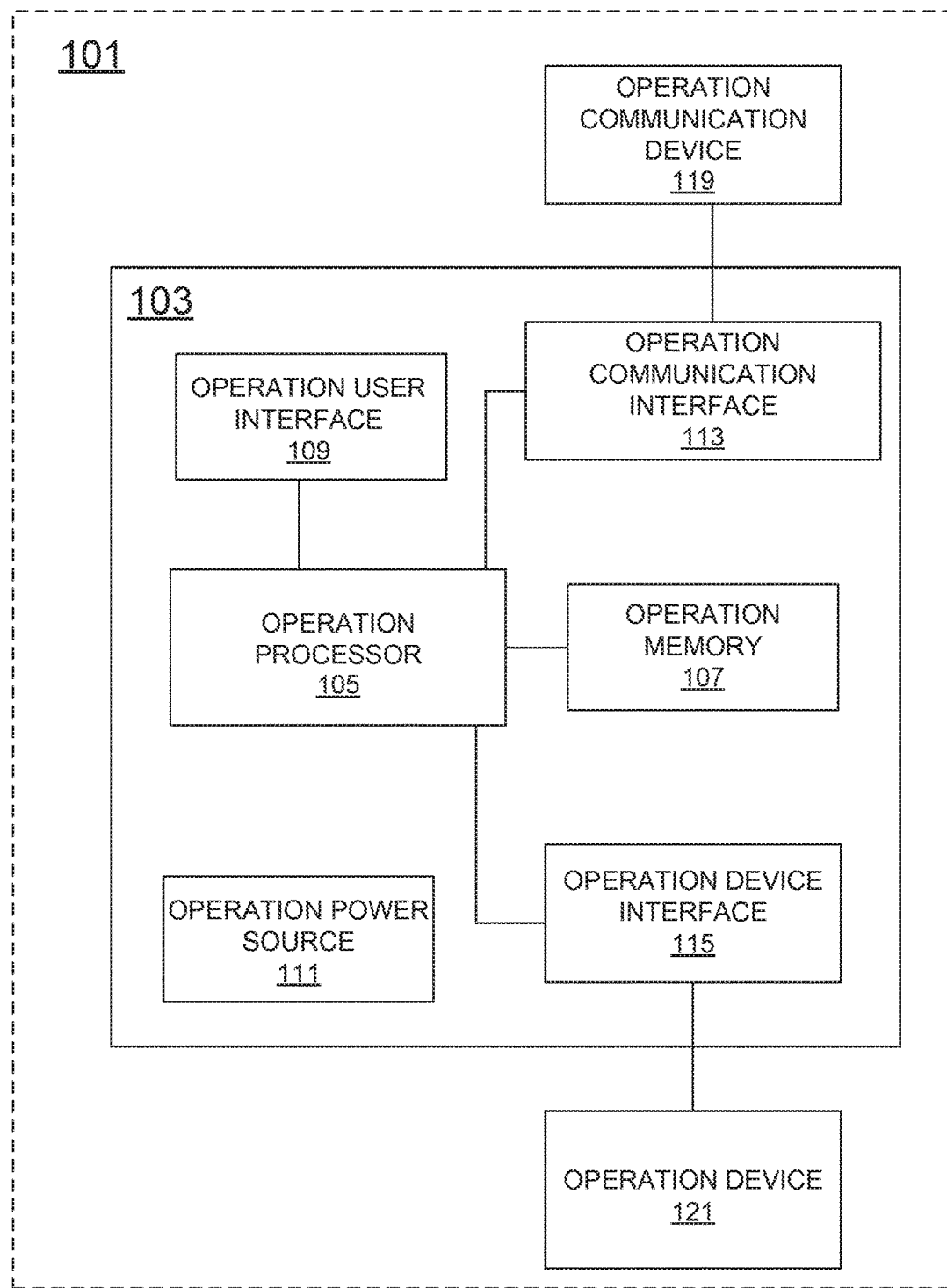
FIG. 18 is a block diagram of an embodiment of a gear changer.

FIG. 18 is a block diagram of an operation component 101. The operation component 101 may be one or more of a previously described component, for instance at least one of the rear gear changer 48 and the front gear changer 50. The operation component 101 may also be another component, such as an internal gearbox component, a suspension or an adjustable suspension component, or an adjustable seating component. A plurality of operation components 101 may be provided.

The operation component 101 is provided with an operation unit 103, which may be a circuit board or alternative configuration as described above. The operation unit 103 includes an operation processor 105, an operation memory 107, an operation user interface 109, an operation power source 111, an operation communication interface 113, and an operation device interface 115. In an embodiment, the operation communication interface 113 is in communication with an operation communication device 119 and the operation device interface 115 is in communication with an operation device 121. Additional, different, or fewer components may be provided. For example, the operation user interface 109 may be omitted.

The structure, connections, and functions of the operation processor 105 may be representative of those of the rear processor, the front processor, or another component. The operation processor 105 may include a general processor, digital signal processor, an ASIC, FPGA, analog circuit, digital circuit, combinations thereof, or other now known or later developed processor. The operation processor 105 may be a single device or combinations of devices, such as through shared or parallel processing.

The operation memory 107 may be a volatile memory or a non-volatile memory. The operation memory 107 may include one or more of a ROM, a RAM, a flash memory, an EEPROM, or other type of memory. The operation memory 107 may be removable from the operation component 101, such as an SD memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The operation memory 107 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

The operation power source 111 is a portable power source, which may be stored internal to the operation component 101 or stored external to the operation component 101 and communicated to the operation component through a power conductive cable. The operation power source 111 may involve the generation of electric power, for example using a mechanical power generator, a fuel cell device, photo-voltaic cells, piezoelectric, or other power-generating devices. The control power source 118 may include a battery such as a device consisting of two or more electrochemical cells that convert stored chemical energy into electrical energy. The control power source 118 may include a combination of multiple batteries or other power providing devices. Specially fitted or configured battery types, or standard battery types may be used.

The operation device interface 115 provides for operation of a component of the bicycle 10. For example, the operation device interface 115 may transmit power from the operation power source 111 to generate movement in the operation device 121. In various embodiments, the operation device interface 115 sends power to control movement of at least one of the rear motor and the front motor. The operation device interface 115 includes wired conductive signal and/or data communication circuitry operable to control the operation device 121.

The operation user interface 109 may be one or more buttons, keypad, keyboard, mouse, stylus pen, trackball, rocker switch, touch pad, voice recognition circuit, or other device or component for communicating data between a user and the operation component 101. The operation user interface 109 may be a touch screen, which may be capacitive or resistive. The operation user interface 109 may include an LCD panel, LED, LED screen, TFT screen, or another type of display. The operation user interface 109 may also include audio capabilities, or speakers.

The operation communication interface 113 is configured to receive, with the operation communication device 119, data such as anticipation signals, operation signals, and/or other signals from bicycle components, for instance the switch device 70. The operation communication interface 113 may also be configured to send data such as status signals for reception with the switch device 70. The operation communication interface 113 communicates the data using any operable connection. An operable connection may be one in which signals, physical communications, and/or logical communications may be sent and/or received. An operable connection may include a physical interface, an electrical interface, and/or a data interface. The operation communication interface 113 provides for wireless communications through the operation communication device 119 in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

Figure 19:
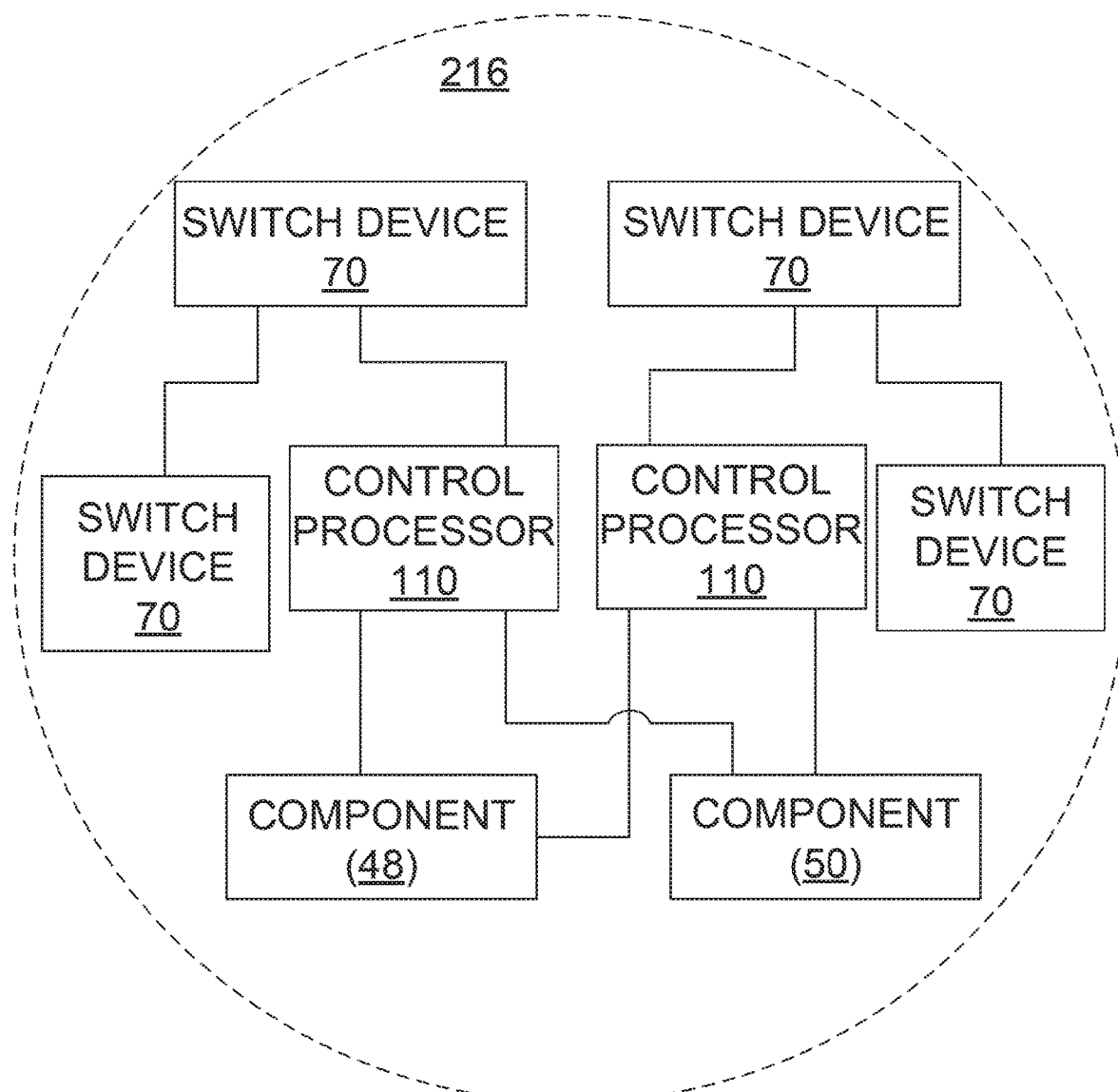
FIG. 19 is a block diagram of an embodiment of an electromechanical control system.

FIG. 19 is a block diagram of an embodiment of an electromechanical control system 216 for a bicycle 10. The electromechanical control system 216 may include one or more series configurations of the switch devices 70. For example, the embodiment of the switch device 70 in FIG. 6 may be connected to the control processor 110 and to the embodiment of the switch device 70 in FIG. 15A. A plurality of the switch devices 70 may connect to a single control processor 110 in parallel or, as shown and described above, in series.

The control processor 110 communicates with at least one component. For instance, the control processor 110 may communicate with the rear gear changer 48 and/or the front gear changer 50. Communication between the control processor 110 and components may be wired or wireless. A plurality of the control processors 110 may be associated with a plurality of components. For example, one or more components may be configured to listen for signals sent by a plurality of the control processors 110. In an embodiment, two of the control processors 110 each communicate with both the rear gear changer 48 and the front gear changer 50.

Figure 20:
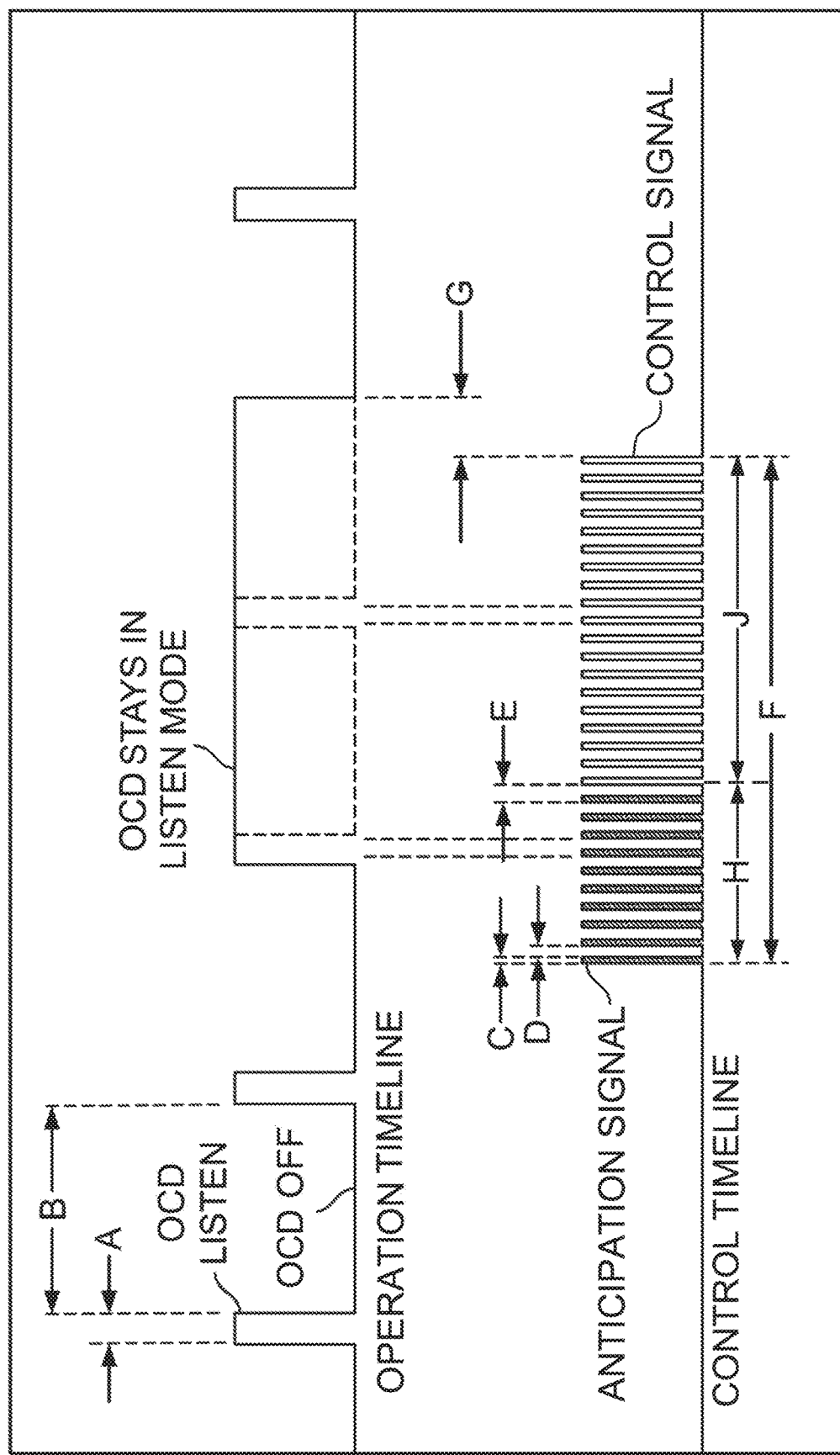
FIG. 20 is a timeline of communication between the control assembly of FIG. 17 and the gear changer of FIG. 18.

FIG. 20 is a timeline of communication between the control assembly 11 and the operation component 101 according to an embodiment. The operation timeline shows activity of the operation communication device ("OCD") 119. The control timeline shows activity of the control communication device 71.

The operation timeline depicts the operation communication device 119 listening for a first period of time A. This listening may be repeated and/or intermittent. The operation timeline also depicts the operation communication device 119 in a rest state, which may be measured with a rest period of time B. In an embodiment, listening may occur intermittently for the first period of time A, with occurrences of listening separated by occurrences of the rest state for the rest period of time B.

The rest state, also referred to as the operation communication device 119 off state (OCD OFF), may correspond to a no power or lower power state of the operation communication device 119 and/or associated components. For example, the operation processor 105 may be configured to send little or no power to the operation communication device 119 during the rest period of time B.

The operation communication device 119 may be configured to listen for an extended period of time G responsive to operation of the switch device 70. Listening for the extended period of time G may be referred to as entering a listen mode for the extended period of time G. For example, signals sent by the control communication device 71 responsive to actuation of the switch device 70 to the first actuation position Y and/or the second actuation position Z may trigger the operation communication device 119 to listen for the extended period of time G when those signals are received by the operation communication device 119 and processed by the operation processor 105.

The extended period of time G is a greater period of time than the first period of time A. The extended period of time G may be a tunable feature. For example, the extended period of time G may be tunable with regard to ambient noise levels detected by the operation communication device 119 and/or the control communication device 71. In an embodiment, the extended period of time G is configured to overlap the sending of at least three signals sent by the control communication device 71.

Signals sent by the control communication device 71 are depicted to include anticipation signals and operation signals. One signal may correspond to one actuation of the control. For example, one anticipation signal may be sent by the control communication device 71 responsive to actuation of the switch device 70 to the first actuation position Y and release therefrom. One operation signal may be sent by the control communication device 71 responsive to an actuation of the switch device 70 through the first actuation position Y and to the second actuation position Z and release therefrom.

Pluralities of signals may also be sent from singular actuations. For example, the control communication device 71 may transmit a plurality of anticipation signals for a first actuation duration H corresponding to the length of time the switch device 70 is actuated to the first actuation position Y. The control communication device 71 may transmit a plurality of operation signals for a second actuation duration J corresponding to the length of time the switch device 70 is actuated to the second actuation position Z. A total actuation duration F may represent a total length of time the switch device 70 is operated to one of the first actuation position Y and the second actuation position Z.

The control assembly 11 may be configured to pause transmission to save power. For example, the control processor 110 may send little or no power to the control communication device 71 when the switch device 70 is in the rest position X. In an embodiment, the control assembly 11 may be configured to pause transmission if error is detected. For example, the control processor 110 may send little or no power to the control communication device 71 when the switch device 70 is in the first actuation position Y for a length of time greater than that anticipated in normal or supernormal but intentional operation.

Signals represented in the control timeline are transmitted for a transmission duration C. For example, signals sent by the control communication device 71, such as the operation signals and/or the anticipation signals, may each be transmitted for the transmission duration C. The transmission duration may be a tunable feature. For example the transmission duration C may be different depending on signal type, such as whether the signal is an anticipation signal, an operation signal, or another type of signal.

A rest duration D represents a period of time between consecutive, like signals. For example, the rest duration D represents a time between consecutive anticipation signals transmitted by the control communication device 71 while the switch device 70 remains in the first actuation position Y. The rest duration D may also represent a time between consecutive operation signals transmitted by the control communication device 71 while the switch device 70 remains in the second actuation position Z.

A transition duration E represents a period of time between signals of different types. For example, the transition duration E represents a time between one of the actuation signals transmitted by the control communication device 71 responsive to the switch device 70 being actuated to the first actuation position Y and one of the operation signals transmitted by the control communication device 71 responsive to the switch device 70 being actuated to the second actuation position Z from the first actuation position Y. The transition duration E may also represent a time between consecutive signals where the first signal is one of the operation signals and the second signal is one of the anticipation signals, as in when a user releases the switch device 70 from the second actuation position Z to the first actuation position Y.

Signal types may be different depending on whether the switch device 70 is being actuated or released. For example, anticipation signals and operation signals may be transmitted responsive to actuation of the switch device 70 and release signals may be transmitted responsive to release of the switch device 70. Release signals may be configured for various operations. For example, the release signal may be configured to trigger the rear gear changer 48 to perform a shift.

In an embodiment, the rear gear changer 48 is configured to delay shifting responsive to receiving the operation signal. This delay may be configured to allow the user to combine multiple actuations to perform operations other than a rear shift. For example, the user may attempt to actuate a pair of the switch devices 70 simultaneously. The rear gear changer 48 may be configured to not perform a shift responsive to this intended simultaneous actuation. However, the rear gear changer 48 may receive the operation signal from one of the switch devices 70 before receiving a signal from the other of the switch devices 70. The rear gear changer 48 may be configured to pause before performing a shift responsive to the operation signal to facilitate detection of this intended simultaneous actuation. In an embodiment, the rear gear changer 48 is configured to perform a shift immediately upon receiving the release signal following the operation signal.

Figure 21:
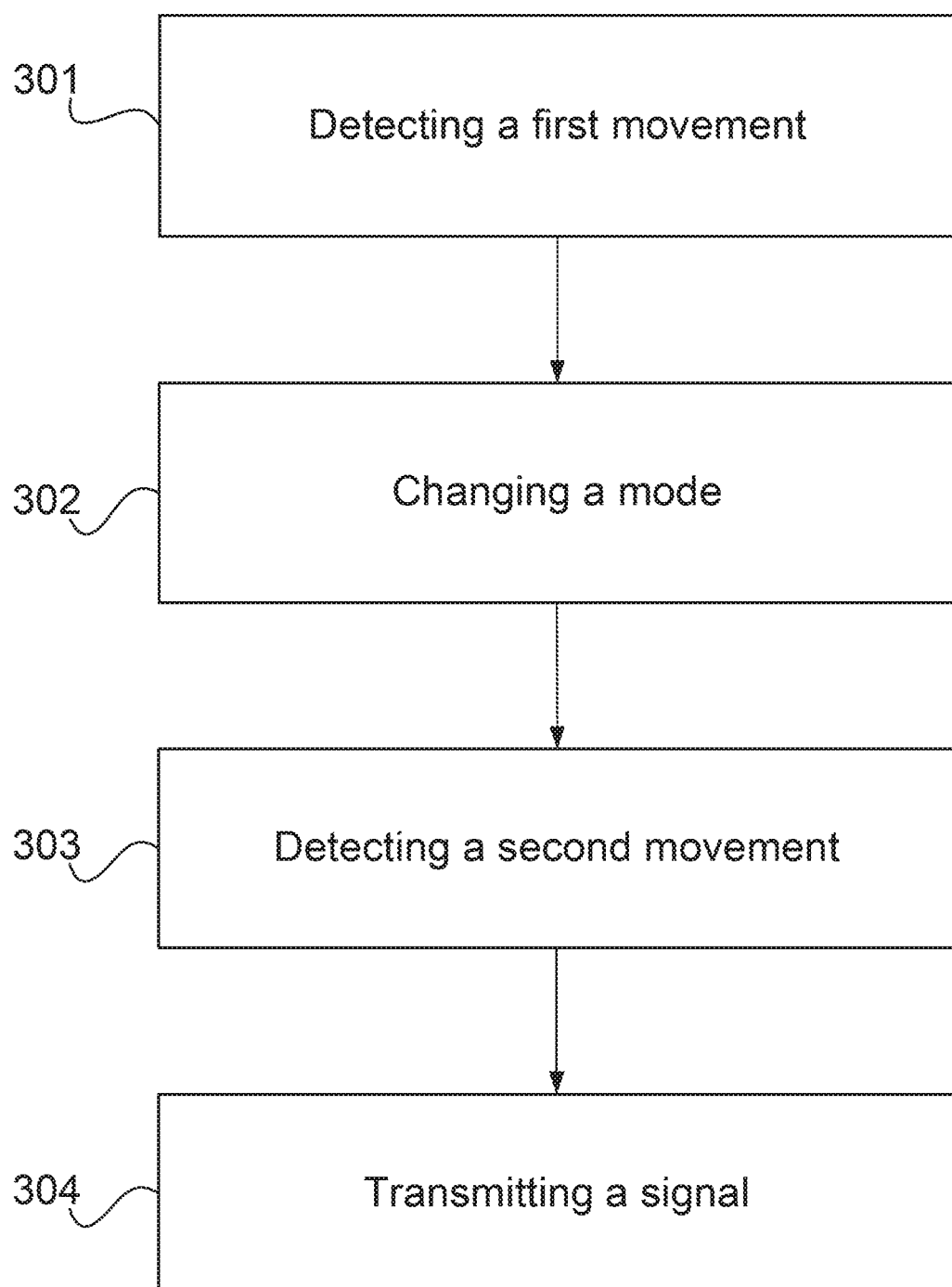
FIG. 21 is a flow chart of an embodiment of a method for electromechanical control of a bicycle.

FIG. 21 is a flow chart of an embodiment of a method for electromechanical control of the bicycle 10. The flowchart also illustrates a method for transmitting and receiving wireless signals on a bicycle. As presented in the following sections, the acts may be performed using any combination of the components indicated in previous figures. For example, the following acts may be performed by the control assembly 11 and the operation component 101, as well as additional or other components. In an embodiment, the acts may be performed by one or more of the control communication device 71, the control processor 110, the operation communication device 119, the operation processor 105, and the operation device 121. Additional, different, or fewer acts may be provided. For example, Act 301 may be omitted. The acts are performed in the order shown or in other orders. The acts may be repeated.

The method includes detecting a first movement (Act 301). The movement may be movement of a switch, such as the first switch 158. This movement may be defined from a first position to a second position. For example, the first switch 158 may move from the rest position X to the first actuation position Y. Detecting may be performed by one or more components. For example, the control processor 110 may control the detection by the control communication device 71. Alternatively, the control processor 110 may detect movement directly for example through electrical connection between the first switch 158 and the control processor 110.

The method also includes changing a mode (Act 302). The mode may be indicative of power consumption or a power level. For example, the mode may be changed from the rest mode of the control communication device 71 to the ready mode of the control communication device 71. Changing of mode may occur responsive to the detecting movement of Act 301. For example, responsive to the movement from the rest position X to the first actuation position Y in Act 301, the control processor 110 may change the control communication device 71 to the ready mode.

The method also includes detecting a second movement (Act 303). The movement may be movement of a switch, such as the first switch 158. This movement may be defined from the second position to a third position. For example, the first switch 158 may move from the first actuation position Y to the second actuation position Z. Detecting may be performed by one or more components. For example, the control processor 110 may control the detection by the control communication device 71. Alternatively, the control processor 110 may detect movement directly for example through electrical connection between the first switch 158 and the control processor 110.

The method also includes transmitting a signal (Act 304). The transmission may be performed by control communication device 71. The signal may be a specific type of signal. For example, the signal may be an operation signal. The transmission of the signal may be for a determined or indeterminate duration. The duration of the signal transmission may define the transmission mode of the control communication device 71. For example, the signal may be transmitted responsive to actuation of the switch device 70 to the second actuation position Z as in Act 303. In this example, transmission of the signal may not conclude until actuation of the switch device 70 changes. Alternatively, a plurality of signals may be transmitted responsive to a single actuation. For example, a pulsed signal transmission may be employed for the duration of the actuation to the second actuation position Z.

Although the detections of movement (Acts 301, 303) are each listed once, it should be recognized that these detections may take place at any point throughout the method. For example, a second detection of the first movement could take place concurrently or subsequently to the transmission of the signal (Act 304).

Figure 22:
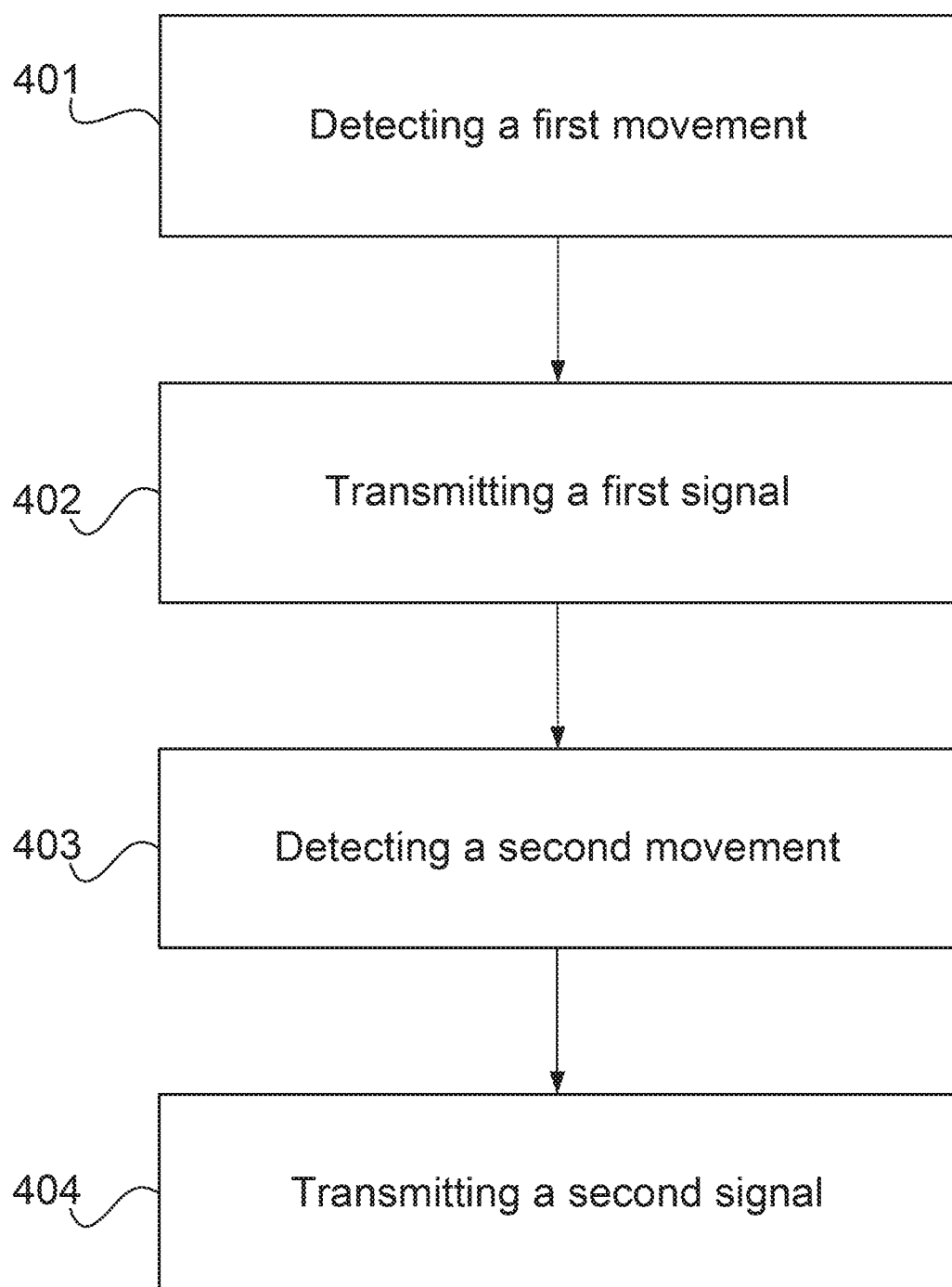
FIG. 22 is a flow chart of an embodiment of a method for electromechanical control of a bicycle.

FIG. 22 is a flow chart of an embodiment of a method for electromechanical control of the bicycle 10. The flowchart also illustrates a method for transmitting and receiving wireless signals on a bicycle. As presented in the following sections, the acts may be performed using any combination of the components indicated in previous figures and as shown in FIG. 21 and described above with reference thereto. The acts are performed in the order shown or in other orders. The acts may be repeated.

The method includes detecting a first movement (Act 401). The movement may be movement of a switch, such as the first switch 158. This movement may be defined from a first position to a second position. For example, the first switch 158 may move from the rest position X to the first actuation position Y. Detecting may be performed by one or more components. For example, the control processor 110 may control the detection by the control communication device 71. Alternatively, the control processor 110 may detect movement directly, for example, through an electrical connection between the first switch 158 and the control processor 110.

The method also includes transmitting a first signal (Act 402). The first signal may be the anticipation signal. For example, the anticipation signal may be transmitted responsive to detecting the first movement and may be operable to change a mode of the operation communication device 119. Additionally or alternatively, the first signal may be operable to change the control communication device 71 from the rest mode to the ready mode. Changing of mode may occur responsive to the detecting movement of Act 401. For example, responsive to the movement from the rest position X to the first actuation position Y in Act 401, the control processor 110 may change the control communication device 71 to the ready mode.

The method also includes detecting a second movement (Act 403). The movement may be movement of a switch, such as the first switch 158. This movement may be defined from the second position to a third position. For example, the first switch 158 may move from the first actuation position Y to the second actuation position Z. Detecting may be performed by one or more components. For example, the control processor 110 may control the detection by the control communication device 71. Alternatively, the control processor 110 may detect movement directly, for example, through an electrical connection between the first switch 158 and the control processor 110.

The method also includes transmitting a second signal (Act 404). The transmission may be performed by control communication device 71. The signal may be a specific type of signal. For example, the signal may be an operation signal. The transmission of the signal may be for a determined or indeterminate duration. The duration of the signal transmission may define the transmission mode of the control communication device 71. For example, the signal may be transmitted responsive to actuation of the switch device 70 to the second actuation position Z as in Act 403. In this example, transmission of the signal may not conclude until actuation of the switch device 70 changes. Alternatively, a plurality of signals may be transmitted responsive to a single actuation. For example, a pulsed signal transmission may be employed for the duration of the actuation to the second actuation position Z.

Although the detections of movement (Acts 401, 403) and the transmissions of signals (Acts 402, 404) are each listed once, it should be recognized that these detections may take place at any point throughout the method. For example, a second detection of the first movement could take place concurrently or subsequently to the transmission of the second signal (Act 404).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A wireless control system for a bicycle, comprising:
   a switch device configured to move from a rest position, through a first actuation position, to a second actuation position, the switch device includes a switch having two physically independent circuits, a first circuit and a second circuit; and
   a control unit comprising a control processor configured to:
   generate a first signal responsive to movement of the switch device from the rest position to the first actuation position closing the first circuit of the switch, the first signal configured to change a mode of a component of the bicycle; and
   generate a second signal responsive to movement of the switch device from the first actuation position to the second actuation position closing the second circuit of the switch, the second signal configured to trigger operation of the component of the bicycle,
   wherein the first signal is configured to change a wireless control communication device from a rest mode to a ready mode, the wireless control communication device located within the switch device.

2. The wireless control system of claim 1, wherein the second signal triggers the wireless control communication device to transmit an operation signal, the operation signal configured to trigger operation of an operation component of the bicycle.

3. The wireless control system of claim 2, wherein the operation component is a gear changer.

4. The wireless control system of claim 2, wherein the operation component is an adjustable suspension component.

5. The wireless control system of claim 3, wherein the first signal is configured to change an operation communication device within the gear changer to the ready mode.

6. The wireless control system of claim 5, wherein the second signal is configured to trigger a shifting operation of the gear changer of the bicycle.

7. The wireless control system of claim 6, wherein the gear changer comprises an configured to control the operation communication device of the gear changer to perform the shifting operation responsive to the second signal.

8. The wireless control system of claim 2, wherein while in the ready mode, the wireless control communication device sends an anticipation signal to a gear changer, causing a change in operation of the gear changer of the bicycle.

9. The wireless control system of claim 8, wherein the operation component of the bicycle is changed to trigger listening.

10. The wireless control system of claim 8, wherein the anticipation signal is a plurality of signals.

11. The wireless control system of claim 1, wherein the wireless control communication device configured to change from the rest mode to the ready mode responsive to the first signal and to change from the ready mode to a transmit mode responsive to the second signal.

12. The wireless control system of claim 11, wherein the ready mode uses more energy than the rest mode but less energy than the transmit mode from a power source of the wireless control system.

13. The wireless control system of claim 1, wherein the switch of the switch device is a dome switch.

14. The wireless control system of claim 13, wherein the dome switch is located on a printed circuit board within the switch device.

* * * * *